US009867175B2

(12) United States Patent
Park et al.

(10) Patent No.: US 9,867,175 B2
(45) Date of Patent: Jan. 9, 2018

(54) TRANSMIT ANTENNA DIVERSITY SCHEME

(71) Applicant: QUALCOMM Incorporated, San Diego, CA (US)

(72) Inventors: Jong Hyeon Park, San Jose, CA (US); Mei Chen, Sunnyvale, CA (US); Subramanya Padubidri Nanyam Rao, San Diego, CA (US); Brian Clarke Banister, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 218 days.

(21) Appl. No.: 14/559,654

(22) Filed: Dec. 3, 2014

(65) Prior Publication Data

US 2016/0165575 A1  Jun. 9, 2016

(51) Int. Cl.
*H04W 72/04* (2009.01)
*H04W 72/12* (2009.01)
*H04W 72/08* (2009.01)
*H04B 7/04* (2017.01)
*H04B 7/06* (2006.01)
*H04B 7/0404* (2017.01)

(52) U.S. Cl.
CPC ........ *H04W 72/042* (2013.01); *H04B 7/0404* (2013.01); *H04B 7/0608* (2013.01); *H04W 72/1268* (2013.01); *H04W 72/0446* (2013.01); *H04W 72/085* (2013.01)

(58) Field of Classification Search
CPC combination set(s) only.
See application file for complete search history.

(56) References Cited

U.S. PATENT DOCUMENTS 8,046,029 B2  10/2011  Teo et al.
2009/0124290 A1  5/2009  Tao et al.
(Continued)

FOREIGN PATENT DOCUMENTS

EP        2015467 A2     1/2009
WO   WO-2010086026 A1  8/2010
(Continued)

OTHER PUBLICATIONS

ISA/EPO, Partial International Search Report of the International Searching Authority, Int'l App. No. PCT/US2015/062907, dated Mar. 3, 2016, European Patent Office, Rijswijk, NL, 7 pgs.
(Continued)

*Primary Examiner* — Yee Lam
(74) *Attorney, Agent, or Firm* — Holland & Hart LLP

(57) ABSTRACT

Methods, systems, and devices are described for mapping, by a UE, uplink transmissions to one or more antennas of the UE. In one aspect, a UE may receive an uplink resource allocation identifying a set of resource blocks (RBs) from a base station. The UE may map subsets of the set of RBs to one or more of a plurality of antennas of the UE and transmit one or more uplink transmissions, using the subsets of the set of resource blocks, on the one or more antennas based at least in part on the mapping. Additionally, in some aspects, the UE may determine channel characteristics or CSI associated with the downlink from the base station and base the mapping of subsets of RBs to one or more antennas of the UE on the determined channel characteristics/CSI.

26 Claims, 13 Drawing Sheets

(56) References Cited

U.S. PATENT DOCUMENTS

| | | | |
|---|---|---|---|
| 2009/0268675 A1* | 10/2009 | Choi | H04L 5/0023 370/329 |
| 2010/0284353 A1 | 11/2010 | Wu et al. | |
| 2011/0128917 A1 | 6/2011 | Ko et al. | |
| 2011/0205930 A1* | 8/2011 | Rahman | H04B 7/0417 370/252 |
| 2012/0213154 A1 | 8/2012 | Gaal et al. | |
| 2013/0083757 A1* | 4/2013 | Kakishima | H04B 7/0417 370/329 |
| 2013/0182594 A1* | 7/2013 | Kim | H04W 72/042 370/252 |
| 2013/0265890 A1 | 10/2013 | Ali et al. | |
| 2013/0301465 A1* | 11/2013 | Seo | H04B 7/0626 370/252 |
| 2014/0233665 A1 | 8/2014 | Clevorn et al. | |
| 2016/0013847 A1* | 1/2016 | Kim | H04B 7/0456 375/267 |

FOREIGN PATENT DOCUMENTS

| | | |
|---|---|---|
| WO | WO-2014022863 A1 | 2/2014 |
| WO | WO-2014172093 A1 | 10/2014 |

OTHER PUBLICATIONS

ISA/EP, International Search Report and Written Opinion of the International Searching Authority, Int'l. App. No. PCT/US2015/062907, dated Jul. 29, 2016, European Patent Office, Rijswijk, NL, 19 pgs.

* cited by examiner

TRANSMIT ANTENNA DIVERSITY SCHEME

BACKGROUND

Field of the Disclosure

The present disclosure, for example, relates to wireless communication systems, and more particularly to mapping uplink transmissions to one or more antennas of a user equipment (UE).

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

In current implementations, UEs may include multiple antennas that support uplink or downlink communications. Multi-antenna UEs, for example, may communicate mainly using a primary antenna by default, even though communication performance (e.g., throughput, latency, etc.) on a secondary or other antenna may exceed the performance on the primary antenna. Therefore, methods for improving selection and use of primary or secondary antennas for communications may be beneficial.

SUMMARY

The described features generally relate to one or more improved systems, methods, or apparatuses for improving uplink communications of a UE by mapping resources for uplink transmission to one or more antennas of the UE. In one aspect, a UE may receive an uplink resource allocation including a set of resource blocks (RBs) to be used by the UE for uplink transmissions from a base station. The UE may map subsets of the allocated resource blocks to one or more antennas of the UE and transmit pending uplink transmissions on the mapped RBs. In some aspects, the UE may map the subsets of RBs on a per slot basis or a per sub frame basis. In yet another aspect, the UE may perform the mapping on an individual RB basis.

In one illustrative embodiment, a method of wireless communication is provided. The method may include receiving, at a UE, an uplink resource allocation from a base station, the uplink resource allocation comprising a set of resource blocks. The method may also include mapping, by the UE, subsets of the set of resource blocks to one or more of a plurality of antennas at the UE. Additionally, the method may include using the subsets of the set of resource blocks to transmit one or more uplink transmissions on the one or more of the plurality of antennas based at least in part on the mapping.

In another illustrative embodiment, a UE apparatus for wireless communication is provided. The UE apparatus may include means for receiving an uplink resource allocation from a base station, the uplink resource allocation comprising a set of resource blocks. the UE apparatus may also include means for mapping subsets of the set of resource blocks to one or more of a plurality of antennas of the UE. Additionally, the UE apparatus may include means for using the subsets of the set of resource blocks to transmit one or more uplink transmissions on the one or more of the plurality of antennas based at least in part on the mapping.

In yet another illustrative embodiment, a UE apparatus for wireless communication may be provided. The UE apparatus may include a processor, memory in electronic communication with the processor, and instructions stored in the memory. The instructions may be executable by the processor to receive an uplink resource allocation from a base station, the uplink resource allocation comprising a set of resource blocks, to map subsets of the set of resource blocks to one or more of a plurality of antennas at the UE, and to use the subsets of the set of resource blocks to transmit one or more uplink transmissions on the one or more of the plurality of antennas based at least in part on the mapping.

In some examples, the mapping is performed on at least one of a per slot basis or a per sub frame basis. In other examples, mapping subsets of the set of resource blocks may include determining downlink channel characteristics for each of the plurality of antennas, and mapping subsets of the set of resource blocks to the one or more of the plurality of antennas based on the downlink channel characteristics. The determining downlink channel characteristics for each of the plurality of antennas may further include determining downlink channel characteristics that include at least one of a signal-to-noise ratio (SNR), a signal-to-interference plus noise ratio (SINR), or a received signal strength indicator (RSSI).

In some examples, the UE may determine downlink channel state information (CSI) for the plurality of antennas. In this case, mapping subsets of the set of resource blocks may include mapping subsets of the set of resource blocks to the one or more of the plurality of antennas based on the downlink CSI for the plurality of antennas. Sub-carriers used for the CSI determination may correspond to the subsets of the set of resource blocks. Determining downlink CSI may further include measuring current downlink CSI of the plurality of antennas, utilizing historical CSI of the plurality of antennas, or a combination thereof.

In some examples, the mapping may further include mapping the subsets of the set of resource blocks to a first antenna having a highest downlink CSI of the plurality of antennas. The subsets of the set of resource blocks may be used to transmit one or more uplink transmissions by selecting the corresponding ones of the plurality of antennas at a digital baseband of the UE. Alternatively, the subsets of the set of resource blocks may be used to transmit one or more uplink transmissions by selecting the corresponding ones of the plurality of antennas at an antenna port of the UE.

In yet another illustrative embodiment, a method of wireless communication is provided. The method may include receiving, at a UE, an uplink resource allocation from a base station via a downlink. The method may also include determining CSI associated with the downlink. The method may additionally include mapping, by the UE, one or more uplink transmissions to one or more antennas of the UE according to the uplink resource allocation and based on the determined CSI. Further, the method may include transmitting the one or more uplink transmissions by the one or more antennas of the UE based on the mapping.

In some examples, the determining CSI associated with the downlink may include determining CSI by at least one of measuring current CSI, utilizing historical CSI, or a combination thereof. The determining CSI associated with the downlink may also include determining the CSI for each of the one or more antennas of the UE.

In some examples, the mapping the one or more uplink transmissions to the one or more antennas of the UE may be based on the CSI associated with the downlink corresponding to individual resource blocks identified in the uplink resource allocation. Additionally, the CSI may include at least one of an SNR, an SINR, or an RSSI.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
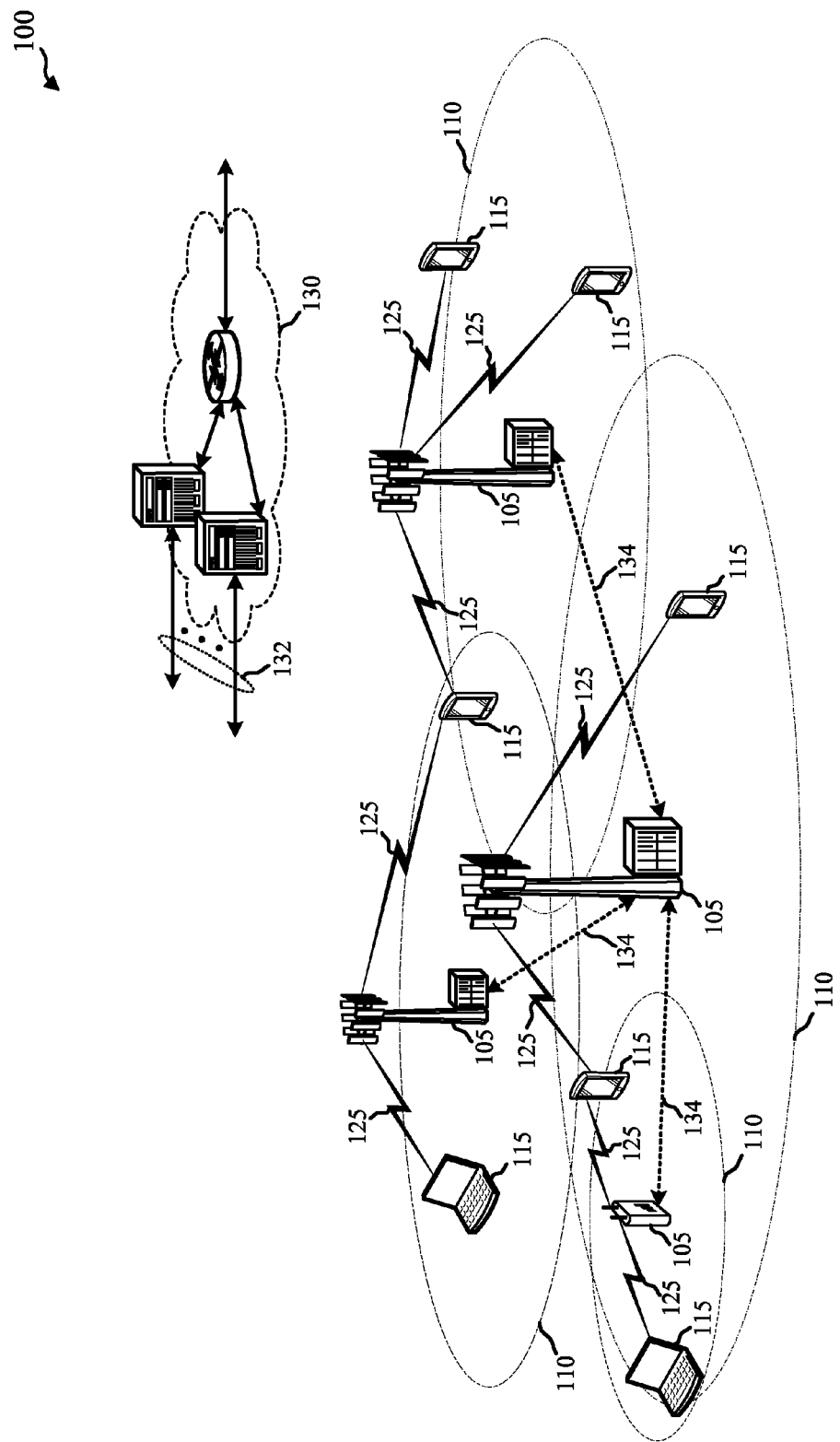
FIG. 1 shows a diagram of a wireless communications system, in accordance with various aspects of the present disclosure.

The described features generally relate to one or more improved systems, methods, or apparatuses for improving uplink communications of a UE by selectively mapping resources for uplink transmission to one or more antennas of the UE. Current UEs supporting communications with multiple antennas may communicate using a primary antenna, for example, by default. However, there may be times when communication performance (e.g., throughput, latency, etc.) on a secondary or other antenna may exceed the performance on the primary antenna. Thus, and for example, a multi-antenna UE may select an antenna on which to transmit uplink data based on a channel response that may be measured without accounting for variations in the communication medium, may be measured periodically, or may be measured for a block of resources that may not be under similar conditions as those used for the transmission, etc.

In some cases, channel metrics (e.g., channel response, effective SNR, or RSSI) may be used to select an antenna on which to transmit uplink data. However, in some cases, channel response or SNR metrics may be measured infrequently, such that the antenna with the best communication performance may not be chosen in real-time. Additionally, in some cases, variations in the communication medium (e.g., different radio environments) may not be accounted for, such that channel response or effective SNR metrics may not be indicative of actual conditions. In yet other cases, wideband RSSI may be used to inform uplink transmit antenna selection without considering other channel response metrics. In this case, the effective SNR may or may not align with the RSSI used to inform the antenna selection, thus potentially resulting in poor antenna selection/communication performance.

Thus, in one aspect of the present disclosure, in order to better inform uplink antenna selection, a UE, after receiving an uplink resource allocation identifying a set of available RBs from a base station, may map subsets of the allocated RBs to one or more antennas of the UE for uplink transmission. The UE may then transmit one or more uplink transmissions using the subsets of allocated RBs on the one or more antennas based on the mapping. Additionally, the UE may determine downlink channel characteristics corresponding to the allocated uplink resources and map subsets of RBs to one or more antennas of the UE based on the determined channel characteristics. In some cases, the channel characteristics may include one or more of an SNR, an SINR, or an RSSI.

In another aspect, a UE may receive an uplink resource allocation on a downlink, for example from a base station, and may determine CSI associated with the downlink. The UE may then map one or more uplink transmissions to one or more antennas of the UE according to the uplink resource allocation and based on the determined CSI. The UE may subsequently transmit the one or more uplink transmissions on the selected antenna(s) based on the mapping. In some aspects, the UE may determine the CSI associated with the downlink by measuring current CSI or utilizing historical CSI, for example for each antenna or for a group of antennas of the UE.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various blocks may be added, omitted, or combined. Also, features described with respect to some examples may be combined in other examples.

FIG. 1 illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro or small cell base stations). There may be overlapping geographic coverage areas 110 for different technologies.

In some examples, the wireless communications system 100 is a Long Term Evolution (LTE)/LTE-Advanced (LTE-A) network. In LTE/LTE-A networks, the term evolved Node B (eNB) may be generally used to describe the base stations 105, while the term UE may be generally used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

In some embodiments, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

In some instances, a UE 115 may receive an uplink resource allocation over a communication link 125 from a base station 105 that includes multiple resource blocks (RBs) that may be used by the UE 115 for uplink communication with the base station 105. According to the techniques described herein, the UE 115 may map subsets of the allocated RBs to one or more antennas of the UE 115 for uplink transmissions to the base station 105. In some instances, the UE 115 may map subsets of RBs to one or more antennas based on downlink channel characteristics measured over communication link 125. In this way, the UE 115 may increase the performance of uplink communications, for example, by choosing the antenna or antennas according to subsets of allocated RBs. Additionally, the UE may increase uplink communication performance by mapping subsets of RBs to different antennas with the best channel characteristics (e.g., best SNR, SINR, RSSI, etc.).

In another aspect, the UE 115 may determine CSI associated with the downlink corresponding to an uplink resource allocation received from a base station 105, for example over communication link 125. The UE 115 may then map one or more pending uplink messages to one or more antennas of the UE 115 based on the determined CSI. The UE 115 may then transmit the one or more uplink messages over communication link 125 via the one the one or more antennas according to the resource allocation and based on the determined CSI. Using these techniques, the UE may realize performance gains in uplink communications.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Figure 2:
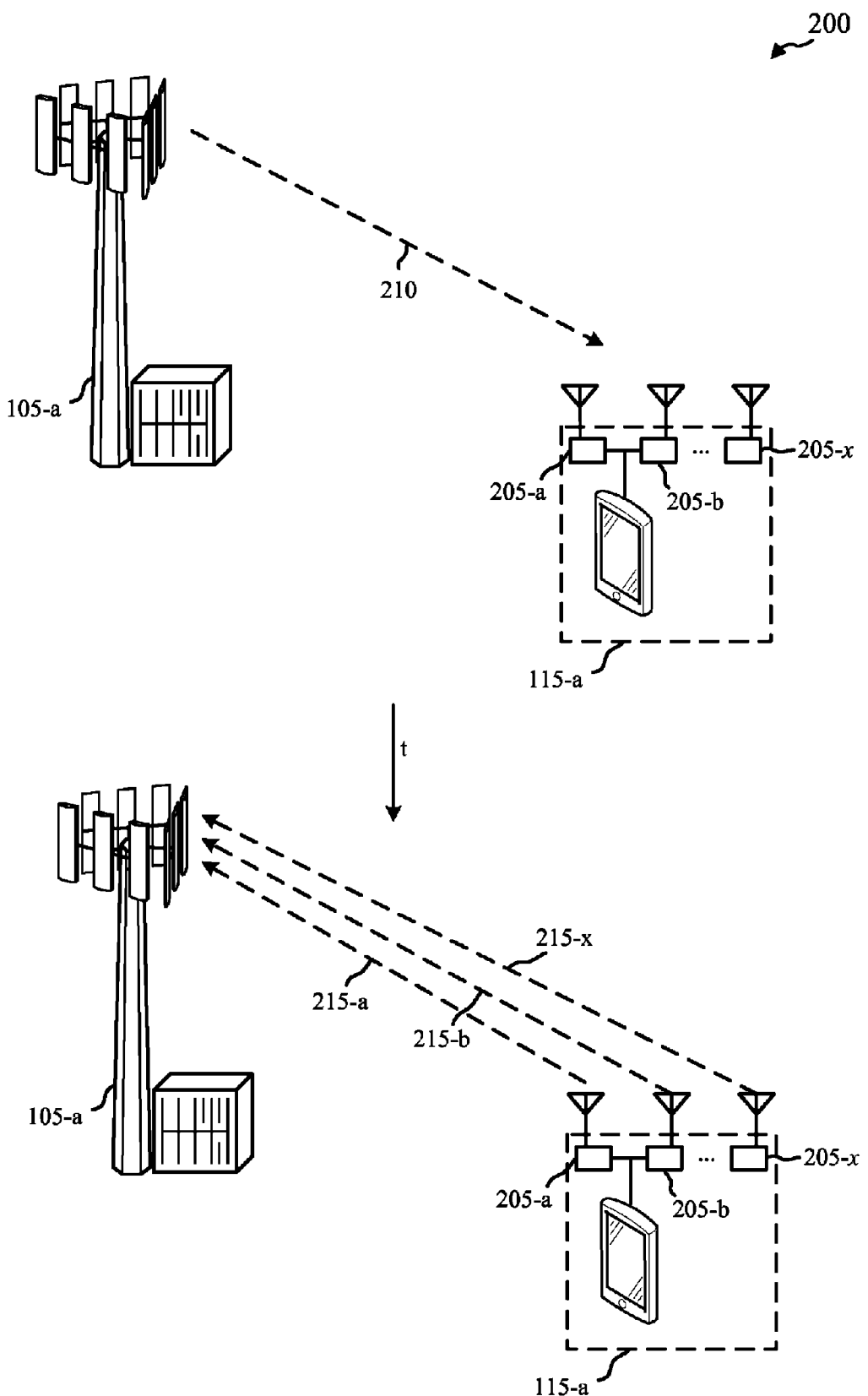
FIG. 2 shows a diagram of an example of uplink and downlink communications between a base station and a user equipment, in accordance with various aspects of the present disclosure.

With reference to FIG. 2, a wireless communications system 200 including a base station 105-a and a UE 115-a communicating over a downlink 210 and an uplink 215 is shown. Wireless communications system 200 may be an example of wireless communications system 100 of FIG. 1. Similarly, base station 105-a or UE 115-a may be an example of one or more aspects of base stations 105 and UEs 115 described with reference to FIG. 1. Downlink 210 and uplinks 215-a, 215-b, and 215-x may be examples of communication link 125 also described in reference to FIG. 1.

In one example, a UE 115-a may establish a communication link, e.g., communication link 125, with a base station 105-a. The base station 105-a, upon request by the UE 115-a, periodically, etc., may determine uplink resources that are available for UE 115-a to use for uplink messaging. The base station 105-a may then transmit, on the downlink 210, an uplink resource allocation to the UE 115-a.

In some scenarios, the UE 115-a may be equipped with multiple antennas 205-a, 205-b, and 205-x. The UE 115-a may designate one or more antennas 205 as primary antennas, such that the designated primary antennas 205 may, by default, receive and transmit messaging. The other antennas 205 that are not the primary antenna(s) 205 may remain in a sleep or inactive state until a trigger condition occurs. The trigger condition may include, for example, data pending for transmission by the UE 115-a, signaling from the base station 105-a, etc. In some cases, the UE 115-a may designate one antenna 205 as a receiving antenna, and one or more, potentially different antennas 205 as transmitting antennas. Accordingly, the UE 115-a may receive the uplink resource allocation sent on the downlink 210 with one or more antennas 205-a through 205-x.

In current implementations, the UE 115-a may allocate resources for pending uplink data according to the received uplink resource allocation and transmit the uplink data on the primary or designated antenna(s) 205. In some cases, transmitting the uplink data on the designated or primary antenna(s) 205 may not result in the desired communication performance, e.g., latency, throughput, etc. Decreased performance arising from use of only a primary or designated antenna(s) may be due to poor channel conditions or characteristics (e.g., CSI) on the allocated resources when utilized by the designated antenna(s) 205. However, by selectively mapping the allocated resources to the multiple antennas 205 of the UE 115-a for uplink transmissions, uplink communication performance may be increased.

In one example, the UE 115-a may be equipped with three antennas, 205-a, 205-b, and 205-x. The UE 115-a may also include any number of antennas. The UE 115-a, after receiving the uplink resource allocation on the downlink 210, may map portions of the allocated resources (e.g., subsets of RBs of the set of allocated resources) to each of the antennas 205-a, 205-b, and 205-x. The UE may then transmit one or more uplink messages or transmissions (e.g., separate messages or portions of one message) using antennas 205-a, 205-b, and 205-x over uplinks 215-a, 215-b, and 215-x, respectively. In some cases, the UE 115-a may determine or measure channel characteristics of the downlink 210 (e.g., over one or more sub-carriers) that correspond to the allocated uplink resources. In some cases, the channel characteristics may be measured or determined for each antenna 205. In other cases, the UE 115-a may determine CSI for the plurality of antennas 205. In either case, the UE 115-a may then base the resource mapping to antennas 205-a, 205-b, and 205-x on the determined channel characteristics/CSI of the downlink. In some cases, the channel characteristics may include SNR, SINR, or RSSI, or other similar metrics. In this way, the UE 115-a may better allocate subsets of resources allocated for uplink transmission across multiple antennas 205 to improve uplink communication performance.

In another example, the UE 115-a may receive an uplink resource allocation on the downlink 210. The UE 115-a may measure or access a historical CSI of the downlink 210. The UE 115-a may then map one or more uplink transmissions to one or more of antennas 205-*a*, 205-*b*, through 205-*x* according to the uplink resource allocation and based on the determined CSI, for example, to maximize or improve throughput, latency, etc., over each uplink 215-*a*, 215-*b*, through 215-*x*.

Figure 3:
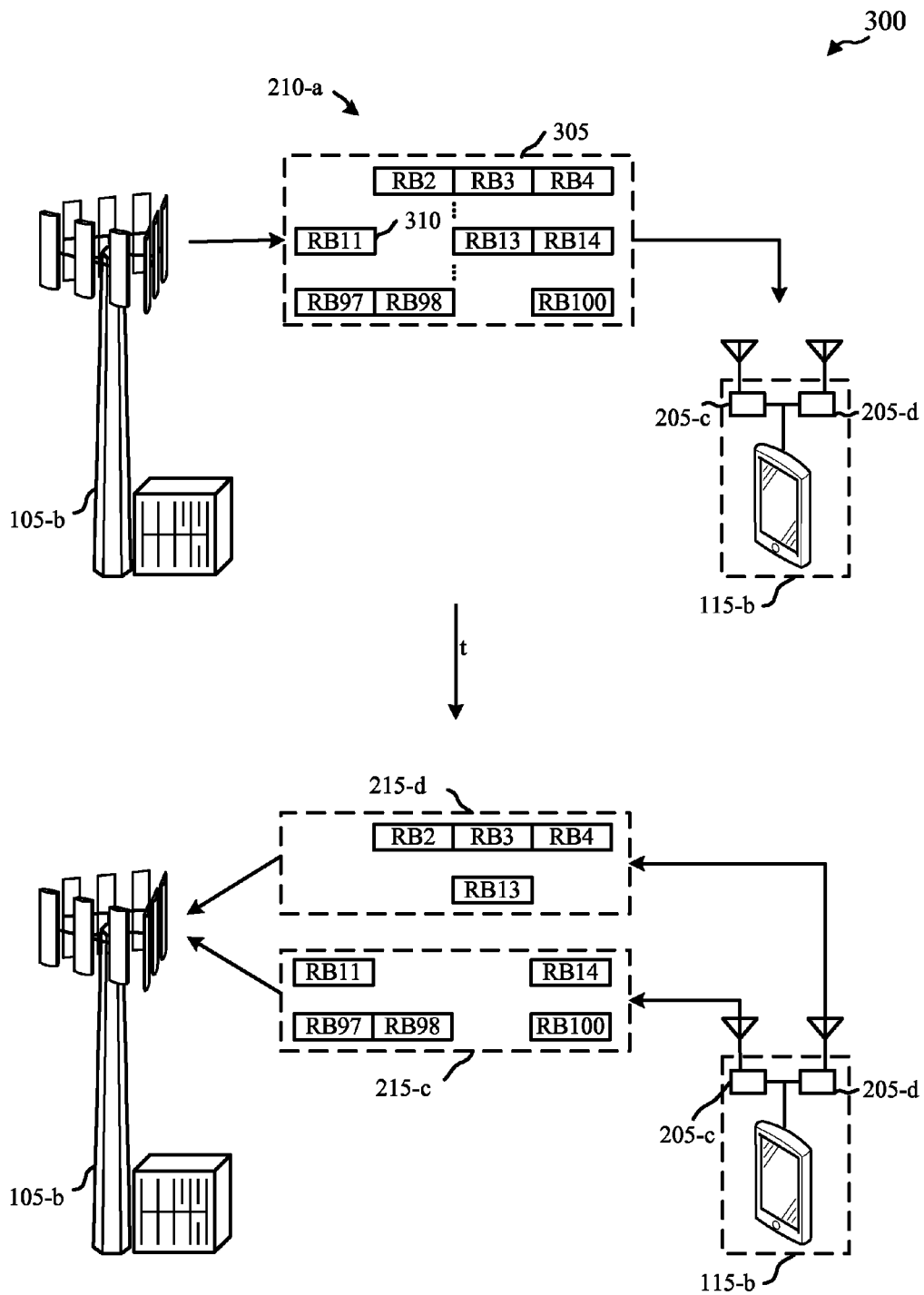
FIG. 3 shows a diagram of another example of uplink and downlink communications between a base station and a user equipment, in accordance with various aspects of the present disclosure.

With reference to FIG. 3, a wireless communications system 300 including a base station 105-*b* and a UE 115-*b* communicating over a downlink 210-*a* and uplinks 215-*c*, 215-*d* is shown. Wireless communications system 300 may be an example of wireless communications system 100 or 200 of FIG. 1 or 2. Similarly, base station 105-*b* or UE 115-*b* may be examples of one or more aspects of base stations 105 and UEs 115 described with reference to FIG. 1 or 2. Downlink 210-*a* and uplinks 215-*c*, 215-*d* may be examples of one or more aspects of downlink 210 or uplinks 215 described with reference to FIG. 2.

In some scenarios, base station 105-*b* may transmit an uplink resource allocation 305 on the downlink 210-*a* to UE 115-*b*. The uplink resource allocation 305 may designate certain RBs 310 that may be used by the UE 115-*b* for uplink communications. In some cases, the uplink resource allocation 305 may be valid for a given time period or until a trigger condition occurs. In one example, the uplink resource allocation 305 may designate RBs 2, 3, 4, 11, 13, 14, 97, 98, and 100 for use by the UE 115-*b* for uplink transmission. It should be appreciated that, in one example, up to 100 RBs may be available for uplink communication in an LTE communications system operating at 20 MHz (e.g., 12 sub-carriers per RB, with a total of 1200 sub-carriers). It should be appreciated that other numbers of RBs may be available for uplink allocation, based on system/channel bandwidth, congestion in the serving cell of base station 105-*b*, etc.

The UE 115-*b* may be equipped with two antennas 205-*c*, 205-*d*. It should be appreciated that UE 115-*b* may be equipped with any number of antennas 205. In some cases the UE 115-*b* may receive the uplink resource allocation 310 using only one of antennas 205-*c*, 205-*d* (for example if the UE 115-*b* was previously or currently in a sleep or inactive state). In other cases, the UE 115-*b* may receive the uplink resource allocation 310 using both antennas 205-*c*, 205-*d*. In either case, the UE 115-*b* may then map subsets of the allocated RBs 310 to each of antennas 205-*c*, 205-*d* for uplink transmission. In one example, the UE may map RBs 11, 14, 97, 98, and 100 to antenna 205-*c* and transmit one or more uplink messages on those RBs over uplink 215-*c*. The UE may additionally map RBs 2, 3, 4, and 13 to antenna 205-*d* and transmit one or more uplink messages on those RBs over uplink 215-*d*. It should be appreciated that any other configuration or mapping of RBs to different antennas 205 of UE 115-*b* is contemplated herein.

In some implementations, the UE 115-*b* may map RBs to each antenna 205-*c*, 205-*d* on a per slot or per sub-frame basis, for example to accommodate different processing capabilities, granularity requirements, etc. of one or more processors operating on UE 115-*b*. For example, when the UE 115-*b* transmits over a physical uplink control channel (PUCCH) or a physical uplink shared channel (PUSCH) or when frequency hopping is enabled, the UE 115-*b* may map RBs to each antenna 205-*c*, 205-*d* on a per slot basis.

In some aspects, the UE 115-*b* may measure/determine channel characteristics or CSI of the downlink 210-*a*, for example when receiving the uplink resource allocation 305. The determined channel characteristics may correspond to some or all of the RBs 310 allocated for uplink communication in the uplink resource allocation 310. The UE 115-*b* may then base the mapping of allocated RBs to antennas 205-*c*, 205-*d* at least in part on the determined channel characteristics or CSI. In one aspect, the UE 115-*b* may determine the channel characteristics or CSI of the downlink 210-*a* for/by each antenna 205-*c*, 205-*d*. In other aspects, the UE 115-*b* may determine the channel characteristics or CSI collectively for both antennas 205-*c*, 205-*d*, for example by taking an average of the response determined over each antenna 205-*c*, 205-*d*, or based on the response determined by only one of antennas 205-*c*, 205-*d* (e.g., if only one antenna 205 is active/set as the primary receive antenna). The UE 115-*b* may determine CSI associated with the downlink 210-*a* by measuring the channel characteristics or CSI in real-time, by accessing historical channel characteristic information of CSI, or a combination thereof.

In some cases, the determined channel characteristics may include SNR, SINR, or RSSI, or other similar metrics. By determining channel characteristics for individual RBs or subsets of RBs, rather than an entire block of RBs used for transmission, RBs may be better chosen and allocated to specific antennas for transmission, such that more accurate channel characteristics may be used for the selection. For example, in scenarios where uplink transmissions are sent over the PUCCH, one RB per slot may be coded with data. The RBs coded for PUCCH in consecutive slots may, however, be at a maximum distance apart, meaning that a coded RB in a first slot may be at position RB0 while a coded RB in a second slot may be at position RB100 (e.g., when there are 100 RBs per slot at 20 MHz operation in LTE). By using channel characteristics determined for smaller subsets or even individual RBs, inaccuracies of using wide band channel characteristics (e.g., wide RSSI) for RB selection (e.g., using channel characteristics of RBs 1 and 100, which may vary greatly) may be greatly reduced. In other scenarios, the described techniques may be similarly applied to the PUSCH, resulting in similar performance gains and benefits.

In some cases, the described techniques may reduce power consumption of UE 115-*b* and may increase performance (e.g., throughput, latency, reduce interference, etc.), particularly for the PUCCH. In some cases, the described techniques may be implemented without necessitating changes in hardware, such as by utilizing and adapting current transmit diversity antenna switching capabilities of a UE 115-*b*. In other circumstances, hardware changes may be made, as described in greater detail below.

Figure 4A:
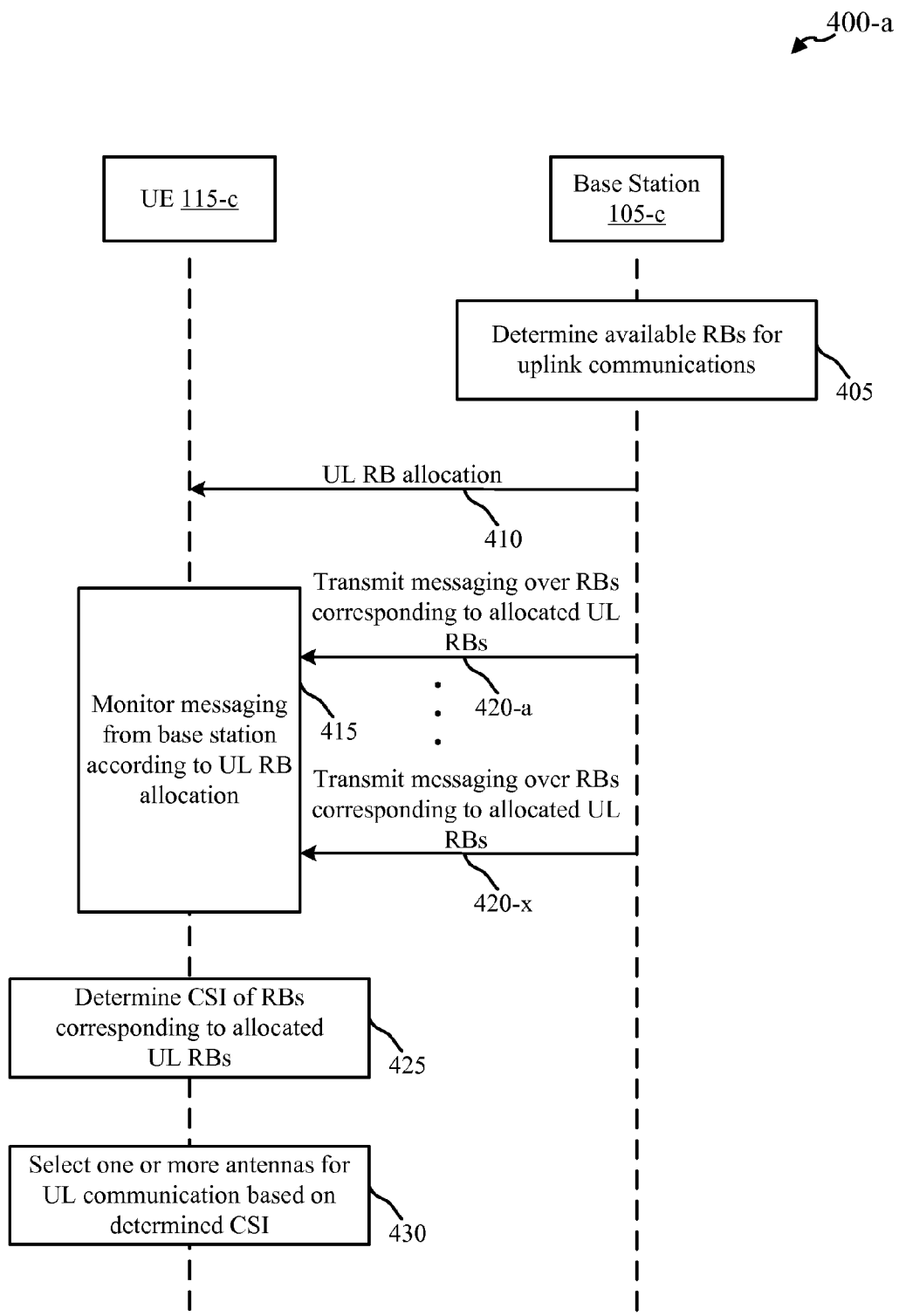
FIGS. 4A and 4B show flow block diagrams of examples of a user equipment, in communication with a base station, selecting one or more antenna for uplink transmission to the base station, in accordance with various aspects of the present disclosure.

With reference to FIG. 4A, a wireless communications system 400-*a* including a base station 105-*c* and a UE 115-*c* in communication with each other according to various embodiments, is shown. Wireless communications system 400-*a* may be an example of wireless communications system 100, 200, or 300 of FIG. 1, 2, or 3. Similarly, base station 105-*c* or UE 115-*c* may be examples of one or more aspects of base stations 105 and UEs 115 described with reference to FIG. 1, 2, or 3. Base station 105-*c* and UE 115-*c* may communicate via downlink 210 or uplinks 215 as described above in reference to FIG. 2 or 3.

Base station 105-*c* may first determine available RBs for uplink communication (at block 405) for UE 115-*c*, for example upon detection of UE 115-*c* or upon reception of a request for resources from UE 115-*c*. The base station 105-*c* may then transmit the uplink (UL) RB allocation (at block 410) to the UE 115-*c*. Upon receiving the uplink resource allocation, for example by one or more of antennas (e.g., antennas 205 of FIG. 2 or 3), the UE 115-*c* may then monitor messaging from base station 105-*c* (at block 415), according to the UL RB allocation sent at 410. Concurrently with the monitoring by the UE 115-*c*, or after transmitting the UL RB allocation at 410, the base station 105-c may transmit messaging over DL RBs corresponding to the allocated UL RBs via messaging 420-a through 420-x. The DL RBs over which downlink messaging 420-a through 420-x are transmitting may correspond to the same (e.g., in time division duplexing (TDD) operation) or similar resources as the RBs designated in the UL RB allocation or grant. In some cases, the base station 105-c may transmit messaging 420-a through 420-x on DL RBs that have or are predicted to have the same channel characteristics as the UL RBs allocated in the UL RB allocation (at block 410). The selection of DL RBs to correspond to the allocated UL RBs may be based on historical information, etc. In some cases, DL messaging 420-a through 420-x may be transmitted over the same sub-carriers as the UL RBs allocated in the UL RB allocation.

After monitoring messaging from the base station 105-c (at block 415), the UE 115-c may then determine CSI (or channel characteristics) of RBs corresponding to the allocated UL RBs (at block 425). In some cases, the determining may include measuring the CSI of downlink messaging 420, accessing historical information relating to downlink CSI, or a combination thereof.

Based on the UL RB allocation and the determined CSI (channel characteristics), the UE 115-c may then select one or more antennas (e.g., antennas 205) for subsequent uplink communications over the allocated RBs (at block 430). Selecting one or more antennas may include mapping one or more RBs, such as one or more subsets of RBs, from the set of allocated RBs identified in the UL RB allocation sent (at block 410) to one or more antennas of the UE 115-c. In some cases, the UE 115-c may map individual RBs to one or more antennas of the UE 115-c for uplink transmissions.

In one scenario, the UE 115-c may map subsets of RBs to one antenna of the UE 115-c having the highest downlink CSI of a plurality of antennas of the UE 115-c. In other scenarios, the UE 115-c may map subsets of RBs to multiple antennas of the UE 115-c.

Figure 4B:
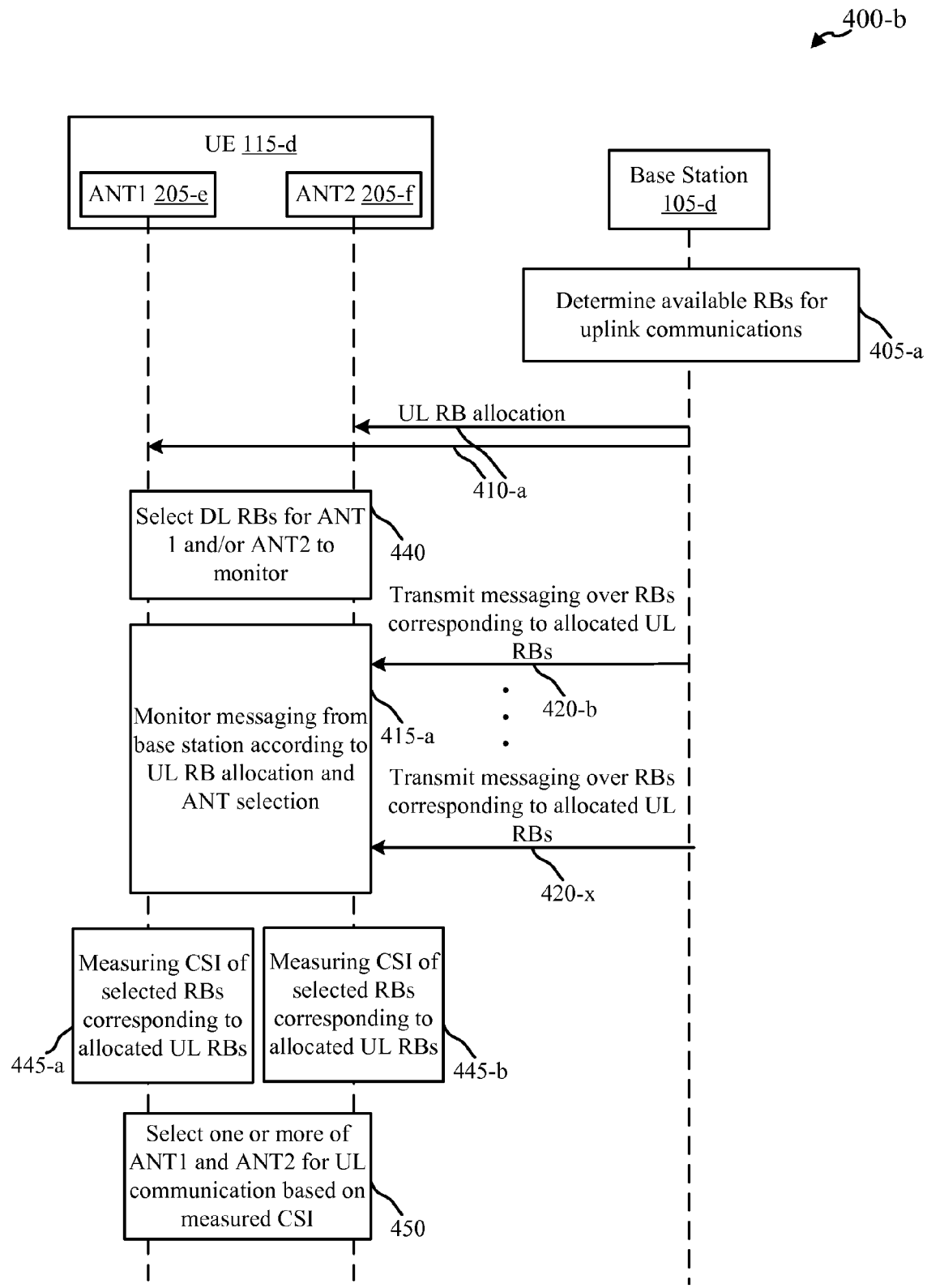

With reference to FIG. 4B, a wireless communications system 400-b including a base station 105-d and a UE 115-d in communication with each other according to various embodiments, is shown. Wireless communications system 400-b may be an example of wireless communications system 100, 200, or 300 of FIG. 1, 2, or 3. Similarly, base station 105-d or UE 115-d may be an example of one or more aspects of base stations 105 and UEs 115 described with reference to FIG. 1, 2, 3, or 4. Base station 105-d and UE 115-d may communicate via downlink 210 or uplinks 215 as described above in reference to FIG. 2 or 3. UE 115-d may be equipped with two antennas ANT1 205-e and ANT2 205-f. However, it should be appreciated that the UE 115-d may be equipped with any number of antennas 205. Antennas 205-e, 205-f may include one or more aspects of antennas 205 described above in reference to FIG. 2 or 3.

As similarly described in reference to FIG. 4A, a base station 105-d may first determine available RBs for uplink communications by a UE 115-d (at block 405-a). The base station 105-d may then transmit an UL RB allocation to the UE 115-d (at block 410-a) over the downlink (e.g., downlink 210 of FIG. 2 or 3). The UE, via antenna ANT1 205-e and antenna ANT 2 205-f, may receive the UL RB allocation transmitted (at block 410-a). It should be appreciated that in other examples contemplated herein, the UE 115-d may receive the UL RB allocation with only one of antenna ANT1 205-e or antenna ANT2 205-f.

After receiving the UL RB allocation, the UE 115-d may then select one or both of antenna ANT1 205-e or antenna ANT2 205-f to monitor some or all DL RBs that correspond to the allocated UL RBs (at block 440). Additionally, after transmitting the UL RB allocation (at block 410-a), the base station 105-d may transmit one or more DL messaging 420-b through 420-x to the UE 115-e over RBs that correspond to RBs identified in the UL RB allocation.

According to the selection of antenna ANT 1 205-e or antenna ANT2 205-f to monitor DL RBs (at block 440), the UE 115-d may then monitor DL messaging 420, corresponding to RBs identified in the UL RB allocation, from the base station 105-d (at block 415-a). Each antenna ANT1 205-e and antenna ANT2 205-f may then measure CSI of the selected DL RBs (at blocks 445-a and 445-b) based on the monitoring performed (at block 415-a). The UE 115-d may select one or more of antenna ANT1 205-e and antenna ANT2 205-f for UL communication based on the measured CSI and based on the UL RB allocation (at block 450). Selecting one or more of antenna ANT1 205-e and antenna ANT2 205-f may include mapping one or more RBs, such as one or more subsets of RBs, from the set of allocated RBs identified in the UL RB allocation sent (at block 410-a) to one or more of antenna ANT1 205-e and antenna ANT2 205-f. The UE 115-d may then transmit uplink messaging over antenna ANT1 205-e or antenna ANT2 205-f according to the mapping/selection performed (at block 450).

Figure 5:
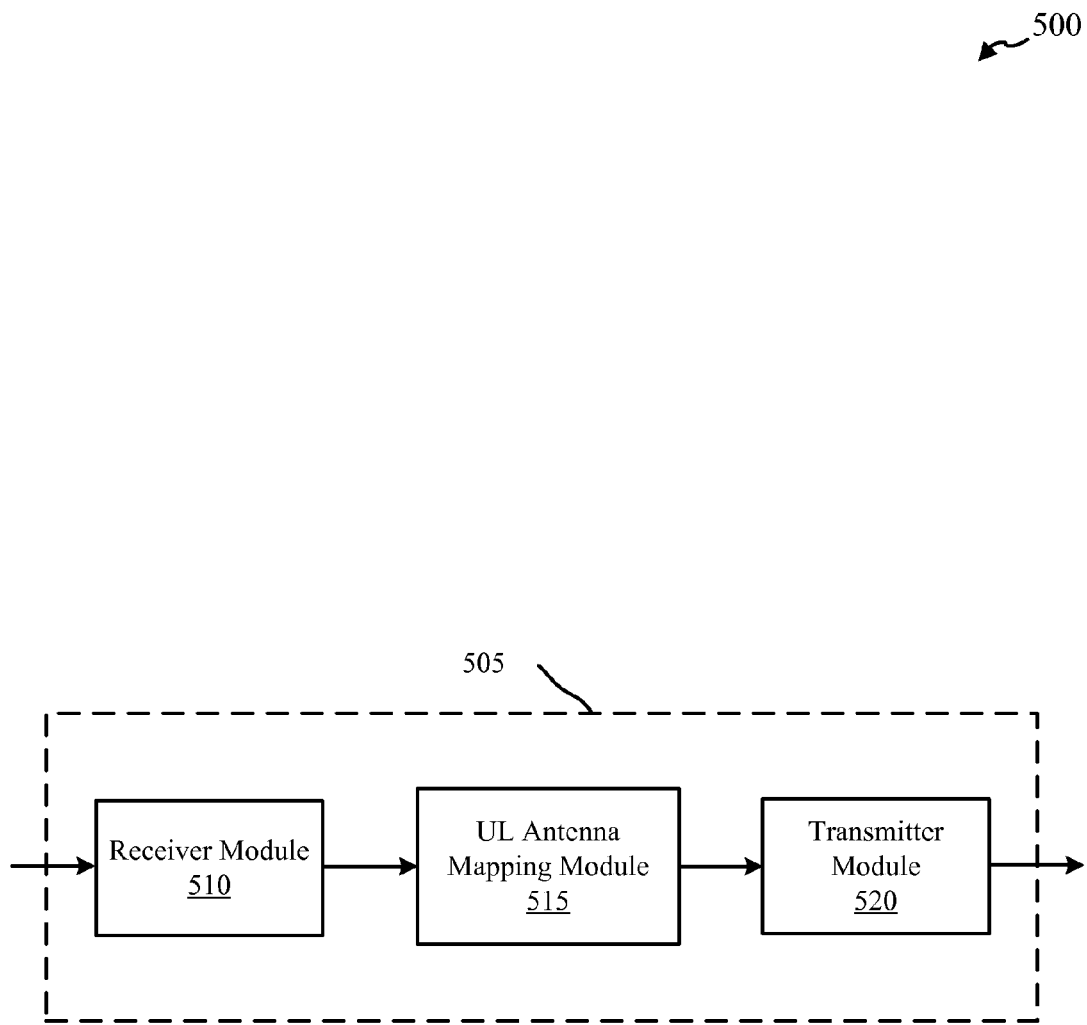
FIG. 5 shows a block diagram of a device configured for use in wireless communication, in accordance with various aspects of the present disclosure.

FIG. 5 shows a block diagram 500 of a device 505 for use in wireless communication, in accordance with various aspects of the present disclosure. The device 505 may be an example of one or more aspects of UEs 115 described with reference to FIG. 1, 2, 3, 4A, or 4B. The device 505 may include a receiver module 510, an UL antenna mapping module 515, and a transmitter module 520, which may include multiple transmit antennas (e.g., 205). The device 505 may also be or include a processor (not shown). Each of these modules may be in communication with each other.

The components of the device 505 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The receiver module 510 may receive information such as packets, user data, or control information associated with various information channels (e.g., control channels, data channels, etc.). The receiver module 510 may be configured to receive an uplink resource allocation, for example transmitted from a base station 105 (e.g., UL resource/RB allocation at block 410 of FIGS. 4A and 4B). The receiver module 510 may identify UL RBs, such as a set of UL RBs, in the UL resource allocation. Information, including, for example one or more identifiers of RBs identified from the UL resource allocation, may be passed on to the UL antenna mapping module 515, and to other components of the device 505 (not shown). In another example, the receiver module 510 may communicate the received UL resource allocation to the UL antenna mapping module 515. The UL antenna mapping module 515 may then identify RBs from the UL resource allocation.

In either case, the UL antenna mapping module 515 may identify a number of transmit antennas (e.g., antennas 205), for example implemented in one or more transmitter modules 520 of the device 505, available for uplink transmission. In some cases, the UL antenna mapping module 515 may request, and subsequently receive, this information from the transmitter module 520. The UL antenna mapping module 515 may perform the identification, for example, periodically, after information associated with an UL resource allocation is communicated by the receiver module 510, randomly, etc. Upon determining how many antennas are supported/available for uplink transmissions, the UL antenna mapping module 515 may then map subsets of the identified RBs of the set of allocated UL RBs to the one or more antennas implemented in the transmitter module 520.

The transmitter module 520 may transmit one or more signals received from other components of the device 505. In one aspect, the transmitter module 520, after receiving the mapping information from the UL antenna mapping module 515, may transmit one or more uplink transmissions according to the received mapping information. In some cases, the UL antenna mapping module 515 may also configure one or more uplink transmissions, map subsets of the allocated RBs to one or more antennas of the transmitter module 520, and instruct the transmitter module 520 to transmit the one or more uplink transmissions or messages. In some examples, the transmitter module 520 may be collocated with the receiver module 510 in a transceiver module (not shown).

In some aspects, the UL antenna mapping module 515 may map subsets of RBs or individual RBs of the set of allocated uplink resources to one or more antennas of the transmitter module 520 on a per slot or per sub frame basis. In scenarios where the device 505/transmitter module 520 communicates over the PUCCH, or when frequency hopping is implemented, mapping antennas on a per slot basis may be particularly useful.

Figure 6:
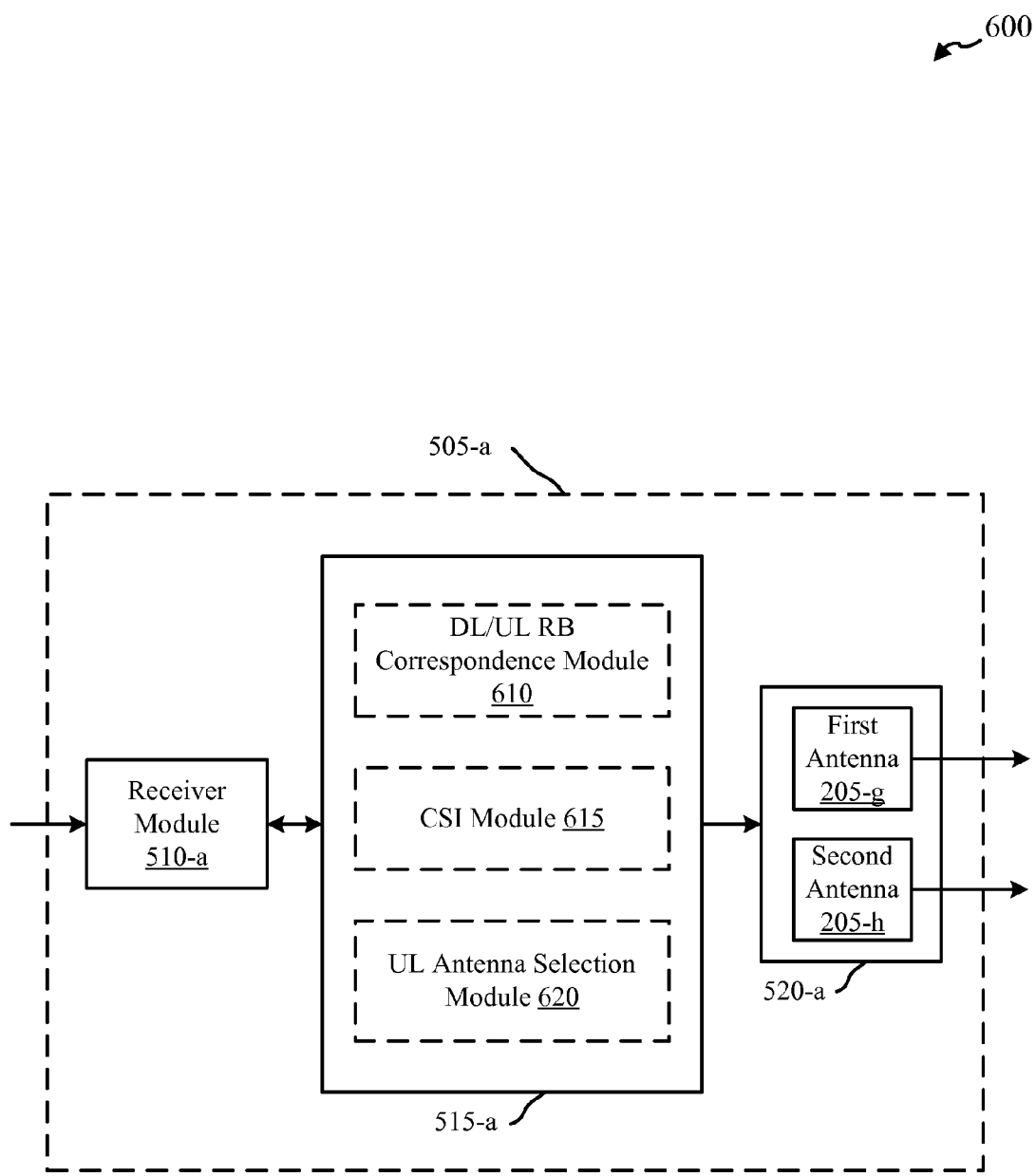
FIG. 6 shows a block diagram of another device configured for use in wireless communication, in accordance with various aspects of the present disclosure.

FIG. 6 shows a block diagram 600 of a device 505-a for use in wireless communication, in accordance with various examples. The device 505-a may be an example of one or more aspects of UEs 115 described with reference to FIG. 1, 2, 3, 4A, or 4B. Device 505-a may also be an example of device 505 described with reference to FIG. 5. The device 505-a may include a receiver module 510-a, an UL antenna mapping module 515-a, and a transmitter module 520-a, which may be examples of the corresponding modules of device 505. The device 505-a may also include a processor (not shown). Each of these components may be in communication with each other. The UL antenna mapping module 515-a may further include one or more of a CSI module 615, a DL/UL RB correspondence module 610, and an UL antenna selection module 620. The receiver module 510-a and the transmitter module 520-a may perform the functions of the receiver module 510 and the transmitter module 520, of FIG. 5, respectively.

The receiver module 510-a, after receiving an UL resource allocation including a set of RBs identified for use by the device 505-a, for example from a base station 105, may communicate information associated with the UL resource allocation/grant to the DL/UL RB correspondence module 610. The DL/UL RB correspondence module 610 may first identify RBs or subsets of RBs of the set of allocated UL RBs. The DL/UL RB correspondence module 610 may then associate DL RBs, for example that the UL resource allocation (e.g., UL resource allocation at block 410) was transmitted on (e.g., over downlink 210), with subsets of allocated UL RBs or individual RBs. The association may be based on similar channel characteristics between the uplink and the downlink, for example, in order to better inform mapping subsets of RBs to different antennas of the device 505-a. In some cases, such as in TDD systems where reciprocity in channel characteristics exists between the uplink and downlink, the DL/UL RB correspondence module 610 may map allocated UL RBs/subsets of RBs to the same corresponding DL RBs. In other cases, the DL/UL RB correspondence module 610 may map DL RBs to UL RBs based on similar historical channel characteristics/CSI, similar predictive channel characteristics/CSI, or by other means or correspondence relationships, for example received or accessed from the CSI module 615. In some cases, the DL RBs may be selected based on the same or similar sub carriers of the allocated uplink RBs used for the DL transmission. In some cases, DL RBs may not be the same RBs as UL RBs identified in the received UL resource allocation. The DL/UL RB correspondence module 610 may then communicate the correspondence information to the CSI module 615.

The CSI module 615 may then instruct the receiver module 510-a to collect/record CSI information of DL RBs corresponding to allocated uplink RBs, according to the correspondence information communicated by the DL/UL RB correspondence module 610. In some cases, the CSI module 615 may instruct the receiver module 510-a to collect only CSI that is representative of some of the DL RBs that correspond to the allocated UL RBs (e.g., one RB representative of a subset of RBs, or one subcarrier representative of a plurality of subcarriers, and so on). In some cases, the DL/UL RB correspondence module 610 may select the representative DL RBs/subcarrier to be monitored for a larger group of RBs/subcarriers. In other cases, the CSI module 615 may determine this information.

The receiver module 510-a may gather the requested CSI information and communicate the results back to the UL antenna mapping module 515-a, and in some cases to the CSI module 615 or UL antenna selection module 620. In some cases, the CSI module 615 may store the CSI information collected by the receiver module 510-a, for example for future use. The UL antenna selection module 620 may then map subsets of UL RBs of the allocated set of UL RBs to one or more antennas 205-g, 205-h of the transmitter module 520-a based on the received UL resource allocation and based on the downlink CSI corresponding to subsets of UL RBs or individual UL RBs. In this way UL communication performance of device 505-a may be increased, for example by more accurately mapping available resources to antennas 205-g, 205-h of device 505-a to account for varying channel characteristics/CSI.

In some cases, the UL antenna selection module 620 may map subsets of UL RBs of the allocated set of UL RBs to the antenna of antennas 205-g, 205-h with the highest or greatest CSI. In some cases, for example, when the transmission medium is not crowded (e.g., does not experience a high level of interference), or when channel characteristics of RBs via one antenna of antennas 205-g, 205-h are much greater than for the other antenna of antennas 205-g, 205-h, selecting one antenna 205-g, 205-h for uplink transmission may result in a desired throughput, latency, etc., for uplink communications.

In some implementations, the receiver module 510-a and the transmitter module 520-a may be co-located in a single transceiver module (not shown). In this example, antennas 205-g, 205-h may be used to obtain antenna specific CSI to better inform antenna selection for uplink communication by the UL antenna selection module 620. In other cases, CSI for both of antennas 205-g, 205-h may be combined (e.g., averaged and the like), to yield one CSI value for uplink antenna selection (e.g., not based on antenna specific CSI).

In some implementations, the UL antenna mapping module 515-a may include one or some of the DL/UL RB correspondence module 610, the CSI module 615, and the UL antenna selection module 620. In some cases, the DL/UL RB correspondence module 610, the CSI module 615, and the UL antenna selection module 620 may operate independently of subsets of RBs included in the received uplink allocation. For example, the DL/UL RB correspondence module 610 may map all of the allocated resources included in the uplink allocation to downlink resources, and communicate the downlink resource information to the CSI module 615. The CSI module 615 may then determine downlink CSI over the designated downlink resources. The CSI module 615 may then communicate the downlink CSI information to the UL antenna selection module 620. Using the downlink CSI information, the UL antenna selection module 620 may map one or more uplink transmissions to one or more of antennas 205-g, 205-h of transmitter module 520-a. The UL antenna selection module 620 may then instruct the corresponding antennas 205-g, 205-h to transmit the one or more uplink messages according to the antenna selection. In this way, processing overhead for uplink antenna selection may be reduced by obtaining only CSI for all of the allocated resources at once, rather than individually/for multiple subset of RBs.

Figure 7:
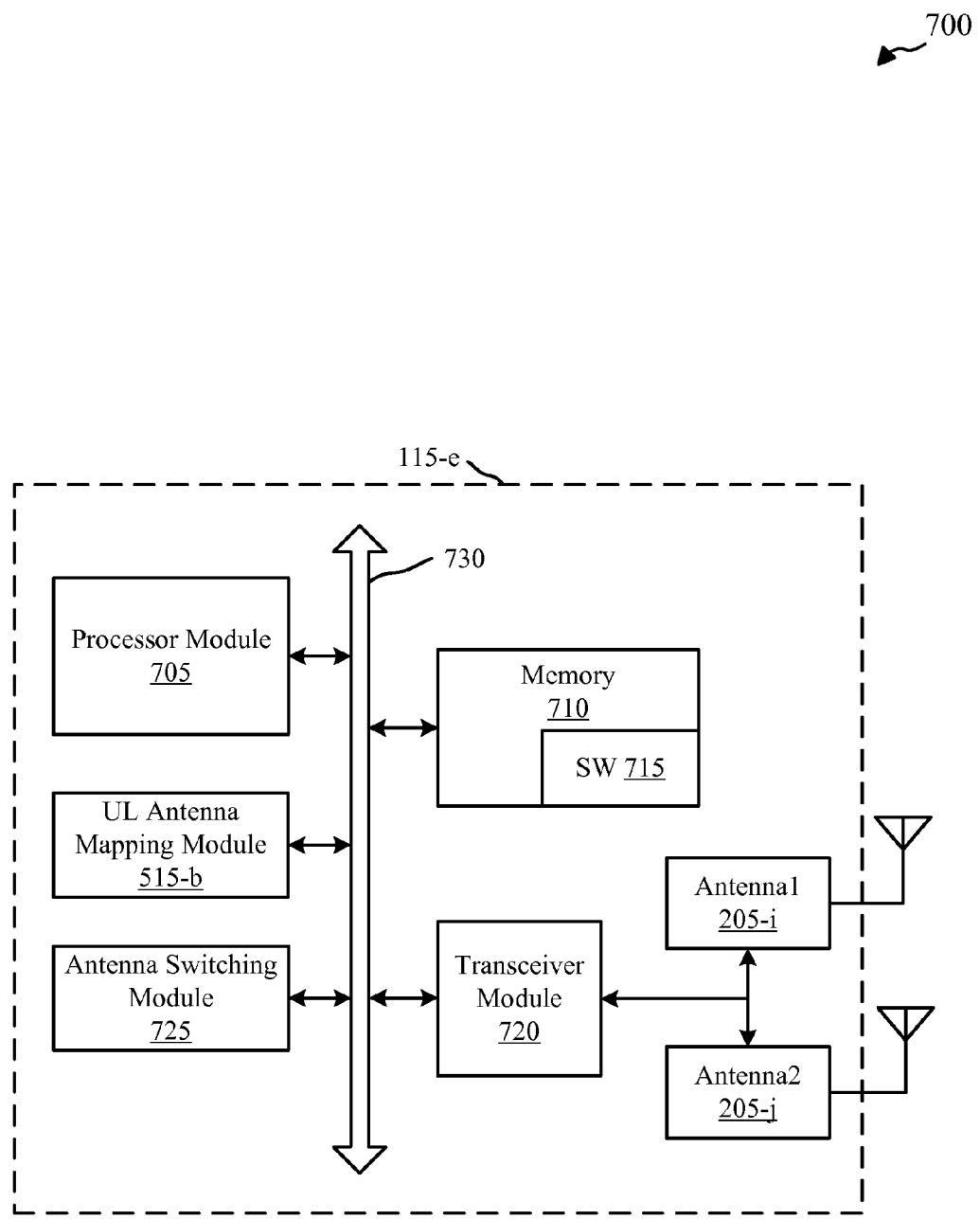
FIG. 7 shows a block diagram of a user equipment configured for use in wireless communication, in accordance with various aspects of the present disclosure.

FIG. 7 shows a system 700 for use in wireless communication, in accordance with various examples. System 700 may include a UE 115-e, which may be an example of the UEs 115 of previous FIGS. 1-4B. UE 115-e may also be an example of one or more aspects of devices 505 of FIG. 5 or 6.

The UE 115-e may generally include components for bi-directional voice and data communications including components for transmitting communications and components for receiving communications. The UE 115-e may include antennas 205-i and 205-j, a transceiver module 720, a processor module 705, and memory 710 (including software (SW) 715), which each may communicate, directly or indirectly, with each other (e.g., via one or more buses 730). The transceiver module 720 may be configured to communicate bi-directionally, via the antennas 205-i, 205-j or one or more wired or wireless links, with one or more networks, as described above. For example, the transceiver module 720 may be configured to communicate bi-directionally with base stations 105 described in reference to previous FIGs. The transceiver module 720 may include a modem configured to modulate the packets and provide the modulated packets to the antennas 205-i, 205-j for transmission, and to demodulate packets received from the antennas 205-i 205-j. The antennas 205-i, 205-j of UE 115-e may be capable of concurrently transmitting or receiving multiple wireless transmissions. The transceiver module 720 may be capable of concurrently communicating with one or more base stations 105 via multiple component carriers.

The UE 115-e may include an UL antenna mapping module 515-b, which may perform the functions described above for the UL antenna mapping modules 515 of device 505 of FIG. 5 or 6. The UE 115-e may also include an antenna switching module 725. In some cases, the antenna switching module 725 may be implemented in or as part of the transceiver module 720, one or more antennas 205, or as a separate component. Upon receiving mapping/antenna selection information from the UL antenna mapping module 515-b, the antenna switching module 725 may control which antenna 205-i, 205-j transmits which data, uplink transmission, portion of one or more uplink transmissions, etc. The antenna switching module 725 may select one or more of antennas 205-i, 205-j based on the RB mapping determined by the UL antenna mapping module 515-b.

The memory 710 may include random access memory (RAM) and read-only memory (ROM). The memory 710 may store computer-readable, computer-executable software/firmware code 715 containing instructions that are configured to, when executed, cause the processor module 705 to perform various functions described herein including mapping one or more uplink transmissions to antennas 205-i, 205-j of UE 115-e for uplink transmission, per subsets of RBs, or based on corresponding DL CSI/channel characteristics. Alternatively, the computer-readable, computer-executable software/firmware code 715 may not be directly executable by the processor module 705 but be configured to cause a computer (e.g., when compiled and executed) to perform functions described herein. The processor module 705 may include an intelligent hardware device, e.g., a central processing unit (CPU), a microcontroller, an application-specific integrated circuit (ASIC), etc.

In some cases, the memory 710 may store historical CSI/channel characteristics of DL RBs/subcarriers that may correspond to some or all of the UL RBs identified in the UL resource allocation. The UL antenna mapping module 515-b may access the memory to retrieve this information to be used in the RB/antenna mapping processes described above in reference to previous FIGS. 1-6.

Figure 8A:
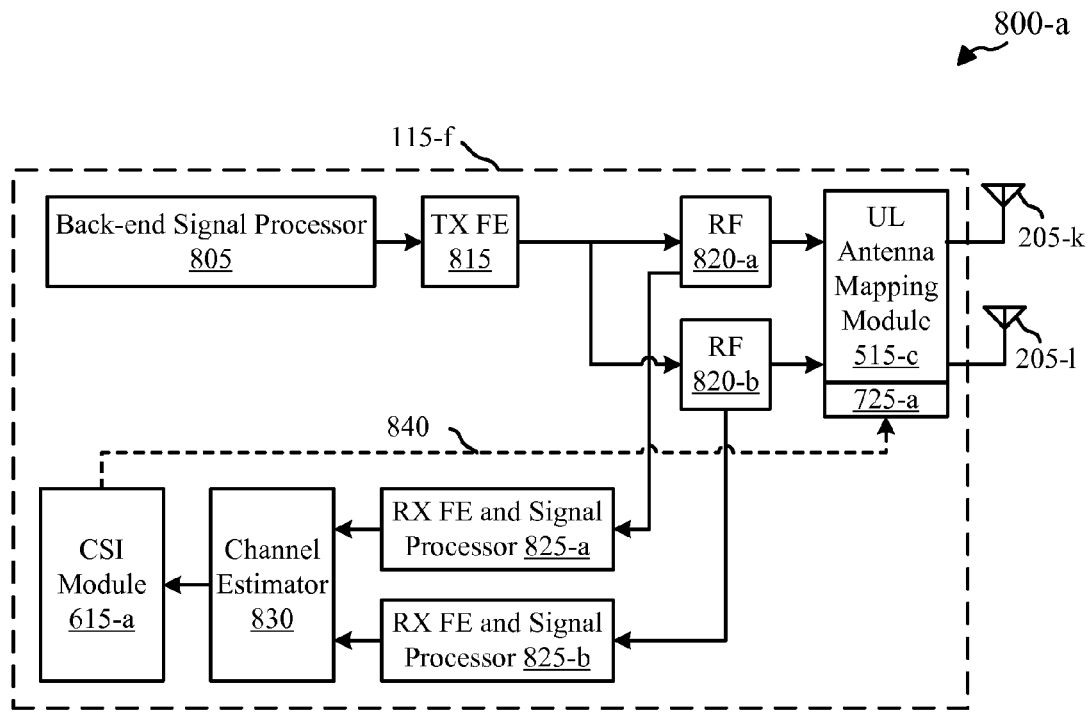
FIGS. 8A and 8B show block diagrams of additional examples of a user equipment configured for use in wireless communication, in accordance with various aspects of the present disclosure.

FIG. 8A shows a block diagram 800-a of a UE 115-f configured for mapping uplink transmissions to one or more of a plurality of antennas, in accordance with various embodiments described herein. The UE 115-f may be an example of one or more aspects of UEs 115 described with reference to previous FIG. 1-4B or 7, or devices 505 described in reference to FIG. 5 or 6. The UE 115-f may include a back-end signal processing module 805, a transmit front end (TX FE) 815, multiple RF blocks 820-a, 820-b each in communication with one or more antennas 205-k, 205-l, multiple receiver front end (RX FE) and signal processors 825-a, 825-b, a channel estimator 830, a CSI module 615-a, and an UL antenna mapping module 515-c. The UL antenna mapping module 515-c may further include an antenna switching module 725-a. Some or all of the components or modules of UE 115-f may be in communication with one another.

The back-end and signal processor 805 may compile, configure, process, etc., one or more uplink transmissions pending at the UE 115-f. The back-end and signal processor 805 may communicate the conditioned one or more uplink transmissions/messages to the TX FE 815. The TX FE 815 may further prepare the one or more uplink transmissions for transmission by antennas 205-k, 205-l and may partition the one or more uplink transmissions and communicate the partitioned uplink transmissions to RF block 820-a, 820-b for transmission via antennas 205-k, 205-l.

In some scenarios, one or more of the RF blocks 820-a, 820-b may receive an uplink resource allocation (e.g., 410) from a base station over a downlink (e.g., 210), such as base station 105, via antennas 205-k, 205-l.

The RX FE and signal processors 825-a, 825-b may process, condition, etc., signals received by antennas 205-k, 205-l communicated via the RF blocks 820-a, 820-b. In some cases, the RX FE and signal processors 825-a, 825-b may process and condition signals received on the downlink 210. The processed signals may then be communicated to the channel estimator 830, which may estimate/determine channel characteristics or CSI associated with the downlink.

In some cases the channel characteristics or CSI may include SNR, SINR, RSSI, etc. The channel estimator 830 may communicate the downlink channel characteristics to the CSI module 615-*a*, which may compare the channel characteristics of each of antennas 205-*k*, 205-*l*. The CSI module 615-*a* may then communicate the CSI information to the UL antenna mapping module 515-*c*. The UL antenna mapping module 515-*c* may map one or more of the conditioned/processed uplink transmissions to one or more of antennas 205-*k*, 205-*l* for transmission. In some cases, the UL antenna mapping module 515-*c* may further include an antenna switching module 725-*a*, which may effectuate the mapping by instructing the antennas 205-*k*, 205-*l* to transmit the uplink transmissions according to the mapping. In this way, the UE 115-*f* may transmit one or more uplink transmissions on one or more of a plurality of antennas 205-*k*, 205-*l* based on downlink CSI to improve uplink communication performance.

Figure 8B:
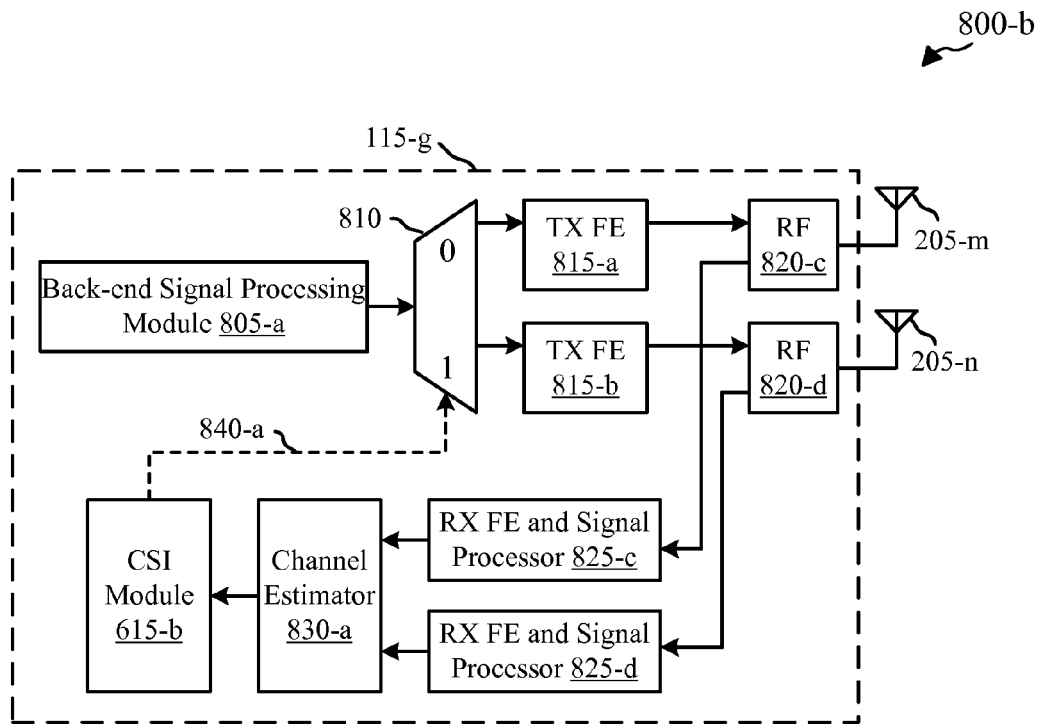

FIG. 8B show block diagrams 800-*b* of a UE 115-*g* configured for mapping uplink transmissions to one or more of a plurality of antennas, in accordance with various embodiments described herein. The UE 115-*g* may be an example of one or more aspects of UEs 115 described with reference to previous FIG. 1-4B or 7, or devices 505 described in reference to FIG. 5 or 6. The UE 115-*g* may include a back-end signal processing module 805-*a*, a digital base band 810, multiple transmit front ends (TX FEs) 815-*a*, 815-*b*, multiple RF blocks 820-*c*, 820-*d* each in communication with one or more antennas 205-*m*, 205-*n*, multiple receiver front end (RX FE) and signal processors 825-*c*, 825-*d*, a channel estimator 830-*a*, and a CSI module 615-*b*. The digital base band 810 may include some or all of the functionality of UL antenna mapping module 515 described in reference to FIG. 5, 6, 7, or 8A. Some or all of the components or modules of UE 115-*f* may be in communication with one another.

The back-end signaling processor 805-*a*, the TX FEs 815-*a*, 815-*b*, the RF blocks 820-*c*, 820-*d*, the RX FE and signal processors 825-*c*, 825-*d*, the channel estimator 830-*a*, and the CSI module 615-*b* may perform similar functions as the corresponding components described in reference to FIG. 8A.

The back-end and signal processor 805-*a* may compile, configure, process, etc., one or more uplink transmissions pending at the UE 115-*f*. The back-end and signal processor 805-*a* may communicate the conditioned one or more uplink transmissions/messages to the digital base band 810. The digital base band 810 may assign the one or more uplink transmissions to one or more of antennas 205-*m*, 205-*n* for transmission, and communicate the assigned uplink transmissions/messages to the corresponding TX FE 815-*a*, 815-*b*, and RF blocks 820-*c*, 820-*d* to condition/processing for ultimate transmission by antennas 205-*m*, 205-*n*.

In some cases, the antennas 205-*m*, 205-*n* may receive communications via the downlink (e.g., 210) from a base station, including an UL resource allocation. The antennas 205-*m*, 205-*n* may communicate the received signals to the CSI module 615-*b* via the RF blocks 820-*c*, 820-*d*, the RX FE and signal processors 825-*c*, 825-*d*, and the channel estimator 830-*a*. The CSI module 615-*b* may determine CSI associated with the downlink for each of the antennas 205-*m*, 205-*n* or for both antennas 205-*m*, 205-*n* collectively, and communicate the CSI to the digital base band 810. The digital base band 810 may then, using this information, select one or more antennas of antennas 205-*m*, 205-*n* to transmit the one or more pending uplink transmissions. The digital base band 810 may then communicate the uplink transmissions according to the mapping to the TX FEs 815-*a*, 815-*b*, the RF blocks 820-*c*, 820-*d*, and the antennas 205-*m*, 205-*n* for uplink transmission.

Figure 9:
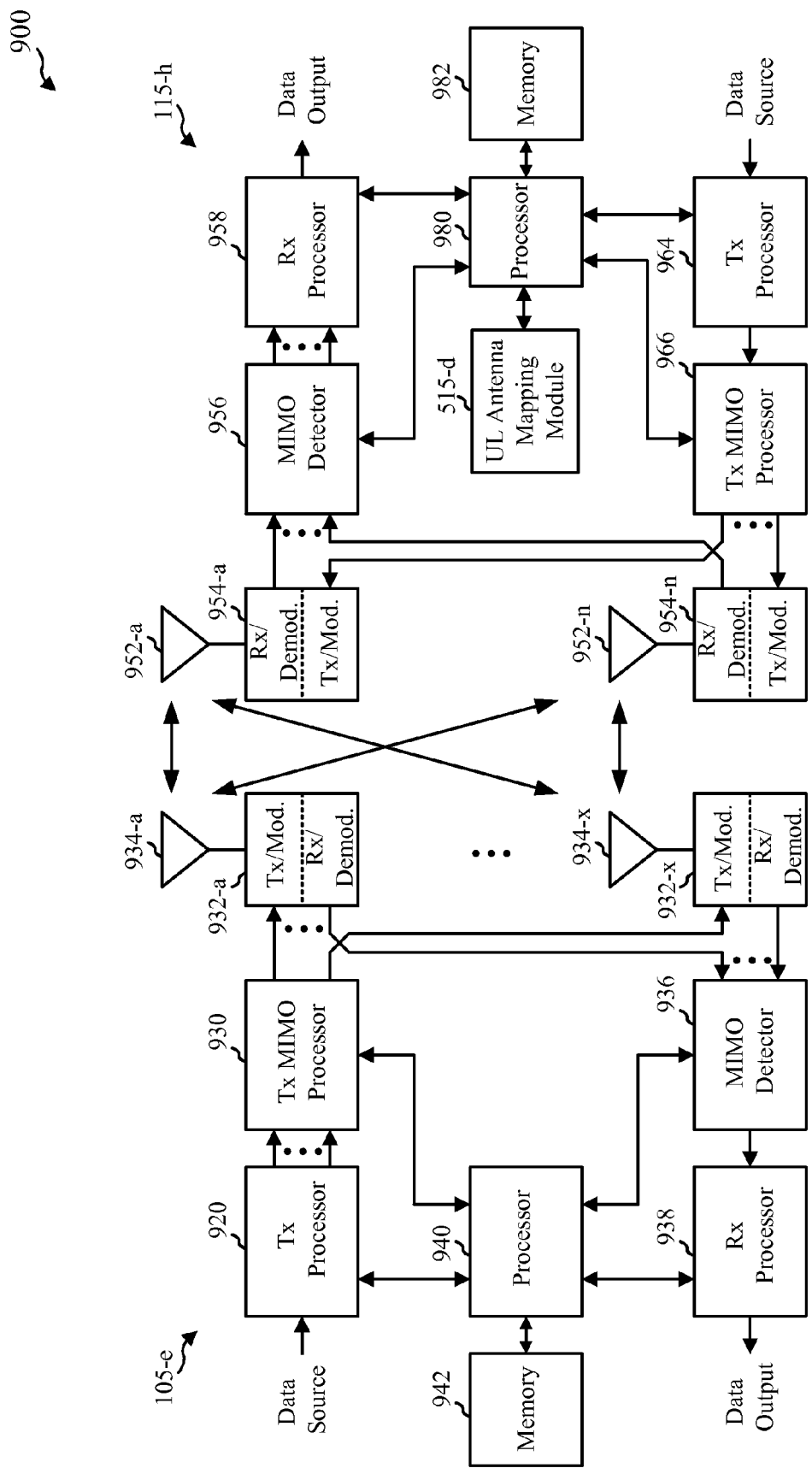
FIG. 9 shows a block diagram of a multiple-input/multiple-output communication system, in accordance with various aspects of the present disclosure.

FIG. 9 is a block diagram of a multiple input/multiple output (MIMO) communication system 900 including a base station 105-*e* and a UE 115-*h*. The MIMO communication system 900 may illustrate aspects of the wireless communications system 100, 200, 300, or 400 described in reference to FIGS. 1, 2, 3, 4A, and 4B. The base station 105-*e* may be equipped with antennas 934-*a* through 934-*x*, and the UE 115-*h* may be equipped with antennas 952-*a* through 952-*n*. In the MIMO communications system 900, the base station 105-*e* may be able to send data over multiple communication links at the same time. Each communication link may be called a "layer" and the "rank" of the communication link may indicate the number of layers used for communication. For example, in a 2×2 MIMO communications system where base station 105-*e* transmits two "layers," the rank of the communication link between the base station 105-*e* and the UE 115-*h* is two.

At the base station 105-*s*, a transmit processor 920 may receive data from a data source. The transmit processor 920 may process the data. The transmit processor 920 may also generate control symbols or reference symbols. A transmit (TX) MIMO processor 930 may perform spatial processing (e.g., precoding) on data symbols, control symbols, or reference symbols, if applicable, and may provide output symbol streams to the transmit modulators 932-*a* through 932-*x*. Each modulator 932 may process a respective output symbol stream (e.g., for OFDM, etc.) to obtain an output sample stream. Each modulator 932 may further process (e.g., convert to analog, amplify, filter, and upconvert) the output sample stream to obtain a DL signal. In one example, DL signals from modulators 932-*a* through 932-*x* may be transmitted via the antennas 934-*a* through 934-*x*, respectively.

At the UE 115-*h*, the UE antennas 952-*a* through 952-*n* which may be examples of antennas 205, may receive the DL signals from the base station 105-*d*, for example over downlink 210, and may provide the received signals to the demodulators 954-*a* through 954-*n*, respectively. Each demodulator 954 may condition (e.g., filter, amplify, downconvert, and digitize) a respective received signal to obtain input samples. Each demodulator 954 may further process the input samples (e.g., for OFDM, etc.) to obtain received symbols. A MIMO detector 956 may obtain received symbols from all the demodulators 954-*a* through 954-*n*, perform MIMO detection on the received symbols, if applicable, and provide detected symbols. A receive processor 958 may process (e.g., demodulate, deinterleave, and decode) the detected symbols, providing decoded data for the UE 115-*h* to a data output, and provide decoded control information to a processor 980, or memory 982.

The processor 980 may in some cases execute stored instructions to instantiate one or more aspects of an UL antenna mapping module 515-*c*. The UL antenna mapping module 515-*c* may be an example of aspects of the UL antenna mapping module 515-*c* described with reference to FIG. 5, 6 or 7, or may incorporate one or more aspects of the CSI module 615 and the antenna switching module 725 described with reference to FIG. 6, 7, 8A, or 8B.

On the uplink (UL), for example uplink 215, at the UE 115-*h*, a transmit processor 964 may receive and process data from a data source. The transmit processor 964 may also generate reference symbols for a reference signal. The symbols from the transmit processor 964 may be precoded by a transmit MIMO processor 966 if applicable, further processed by the demodulators 954-*a* through 954-*n* (e.g., for SC-FDMA, etc.), and be transmitted to the base station 105-*e* in accordance with the transmission parameters received from the base station 105-*e*. At the base station 105-*e*, the UL signals from the UE 115-*h* may be received by the antennas 934, processed by the demodulators 932, detected by a MIMO detector 936 if applicable, and further processed by a receive processor 938. The receive processor 938 may provide decoded data to a data output and to the processor 940 or memory 942.

The components of the UE 115-*h* may, individually or collectively, be implemented with one or more ASICs adapted to perform some or all of the applicable functions in hardware. Each of the noted modules may be a means for performing one or more functions related to operation of the MIMO communications system 900. Similarly, the components of the base station 105-*e* may, individually or collectively, be implemented with one or more ASICs adapted to perform some or all of the applicable functions in hardware. Each of the noted components may be a means for performing one or more functions related to operation of the MIMO communications system 900.

Figure 10:
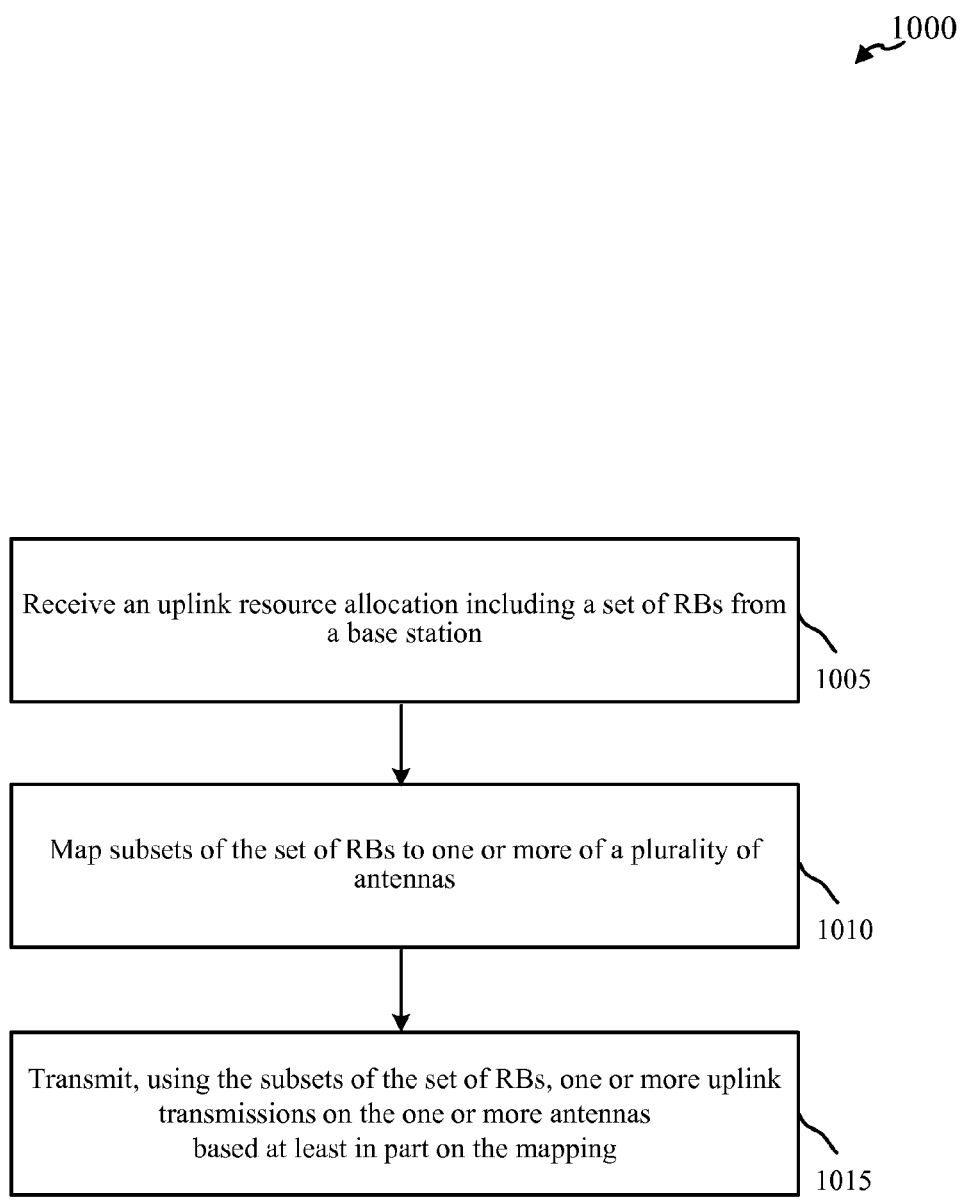
FIGS. 10-12 show flow charts illustrating examples of methods for wireless communication, in accordance with various aspects of the present disclosure.

FIG. 10 is a flow chart illustrating an example of a method 1000 for wireless communication, in accordance with various aspects of the present disclosure. For clarity, the method 1000 is described below with reference to aspects of one or more of a UE 115 described with reference to previous FIG. 1-4B or 7-9, or aspects of one or more devices 505 described with reference to FIG. 5 or 6. In some examples, a UE 115 may execute one or more sets of codes to control the functional elements of the UE 115 to perform the functions described below. Additionally or alternatively, the UE 115 may perform one or more of the functions described below using special-purpose hardware.

At block 1005, the method 1000 may include a UE 115 receiving an uplink resource allocation including a set of RBs from a base station, such as base station 105. The operation(s) at block 1005 may be performed using the receiver module 510, or transceiver module 720 and one or more antennas 205 described with reference to FIG. 5, 6, or 7.

At block 1010, the UE 115 may map subsets of the set of RBs to one or more of a plurality of antennas, such as antennas 205, of the UE 115. In some cases, the UE 115 may map individual RBs to one or more of antennas of the UE 115. In yet some cases, the UE 15 may map subsets of RBs on a per slot or per sub frame basis. The operation(s) at block 1010 may be performed using the UL antenna mapping module 515 described with reference to FIG. 5, 6, or 7.

At block 1015, the UE 115 may transmit, using the subsets of the set of RBs, one or more uplink transmissions on the one or more antennas based at least in part on the mapping. The operation(s) at block 1015 may be performed using the transmitter module 520, or the transceiver module 720 and one or more antennas 205 described with reference to FIG. 5, 6, or 7.

Thus, the method 1000 may provide for wireless communication. It should be noted that the method 1000 is just one implementation and that the operations of the method 1000 may be rearranged or otherwise modified such that other implementations are possible.

Figure 11:
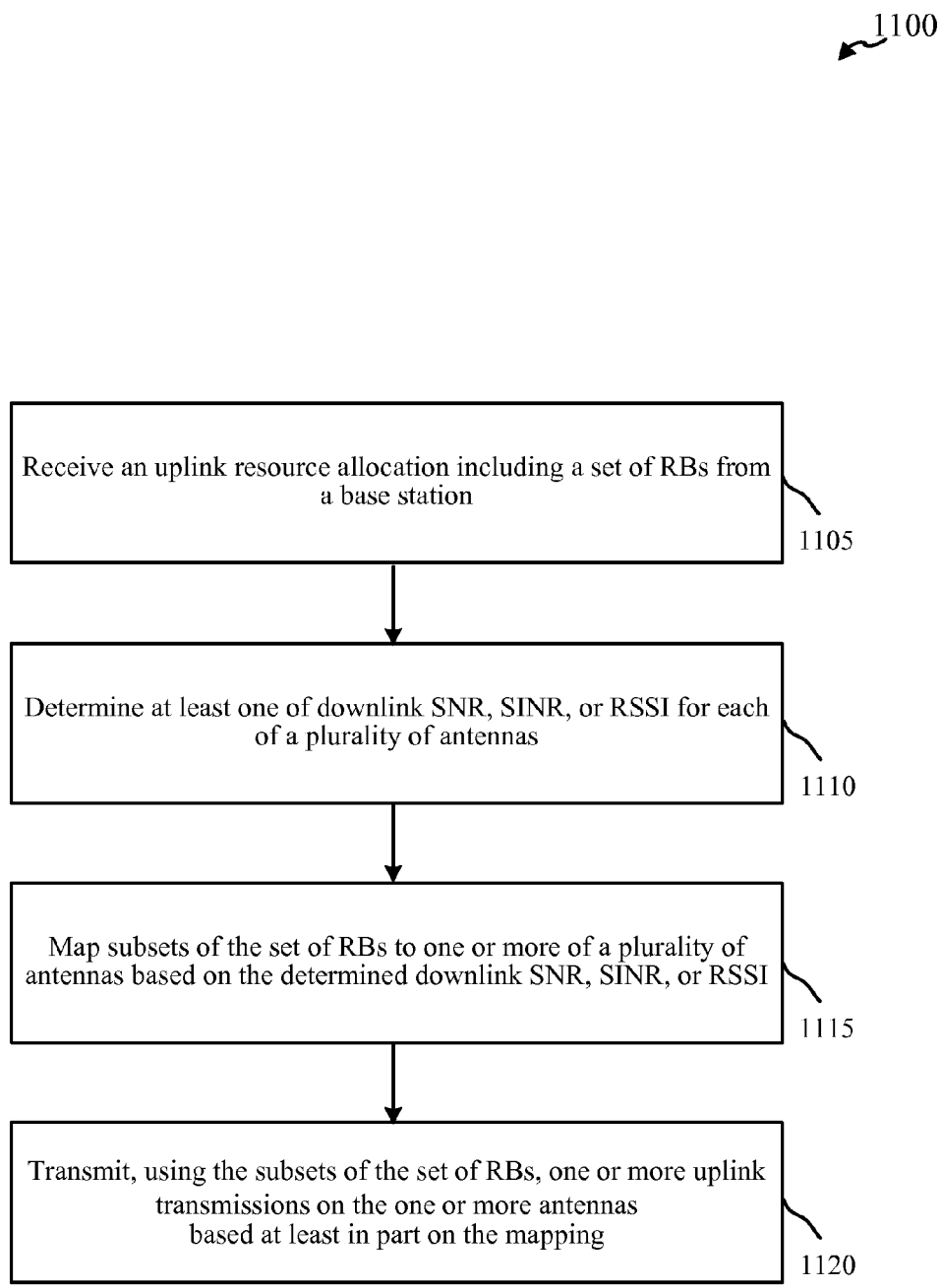

FIG. 11 is a flow chart illustrating an example of a method 1100 for wireless communication, in accordance with various aspects of the present disclosure. For clarity, the method 1100 is described below with reference to aspects of one or more of a UE 115 described with reference to previous FIG. 1-4B or 7-9, or aspects of one or more devices 505 described with reference to FIG. 5 or 6. In some examples, a UE 115 may execute one or more sets of codes to control the functional elements of the UE 115 to perform the functions described below. Additionally or alternatively, the UE 115 may perform one or more of the functions described below using special-purpose hardware.

At block 1105, the method 1100 may include a UE 115 receiving an uplink resource allocation including a set of RBs from a base station, such as base station 105. The operation(s) at block 1105 may be performed using the receiver module 510, transceiver module 720 and one or more antennas 205, or one or more RF blocks 820, described with reference to FIG. 5, 6, 7, or 8B.

At block 1110, the UE 115 may determine at least one of downlink SNR, SINR, or RSSI (e.g., channel characteristics or CSI) for each of a plurality of antennas, such as antennas 205, of the UE 115. In some cases, the UE 115 may determine at least one of downlink SNR, SINR, or RSSI for a group or all of the plurality of antennas 205 of the UE 115, for example by averaging values measured by each of antennas 205. The operation(s) at block 1110 may be performed using the UL antenna mapping module 515, or one or both of the CSI module 615 and the channel estimator 830 described with reference to FIG. 5, 6, 7, or 8B.

At block 1115, the UE 115 may map subsets of the set of RBs to one or more of a plurality of antennas, such as antennas 205, based on the determined downlink SNR, SINR, or RSSI. The operation(s) at block 1115 may be performed using the UL antenna mapping module 515, the UL antenna selection module 620, or the digital base band 810, described with reference to FIG. 5, 6, 7, or 8B.

At block 1120, the UE 115 may transmit, using the subsets of the set of RBs, one or more uplink transmissions on the one or more antennas of the UE 115, such as antennas 205. The operation(s) at block 1120 may be performed using the transmitter module 520, the transceiver module 720 and one or more antennas 205, or one or more of RF blocks 820, described with reference to FIG. 5, 6, 7, or 8B.

Thus, the method 1100 may provide for wireless communication. It should be noted that the method 1100 is just one implementation and that the operations of the method 1100 may be rearranged or otherwise modified such that other implementations are possible.

Figure 12:
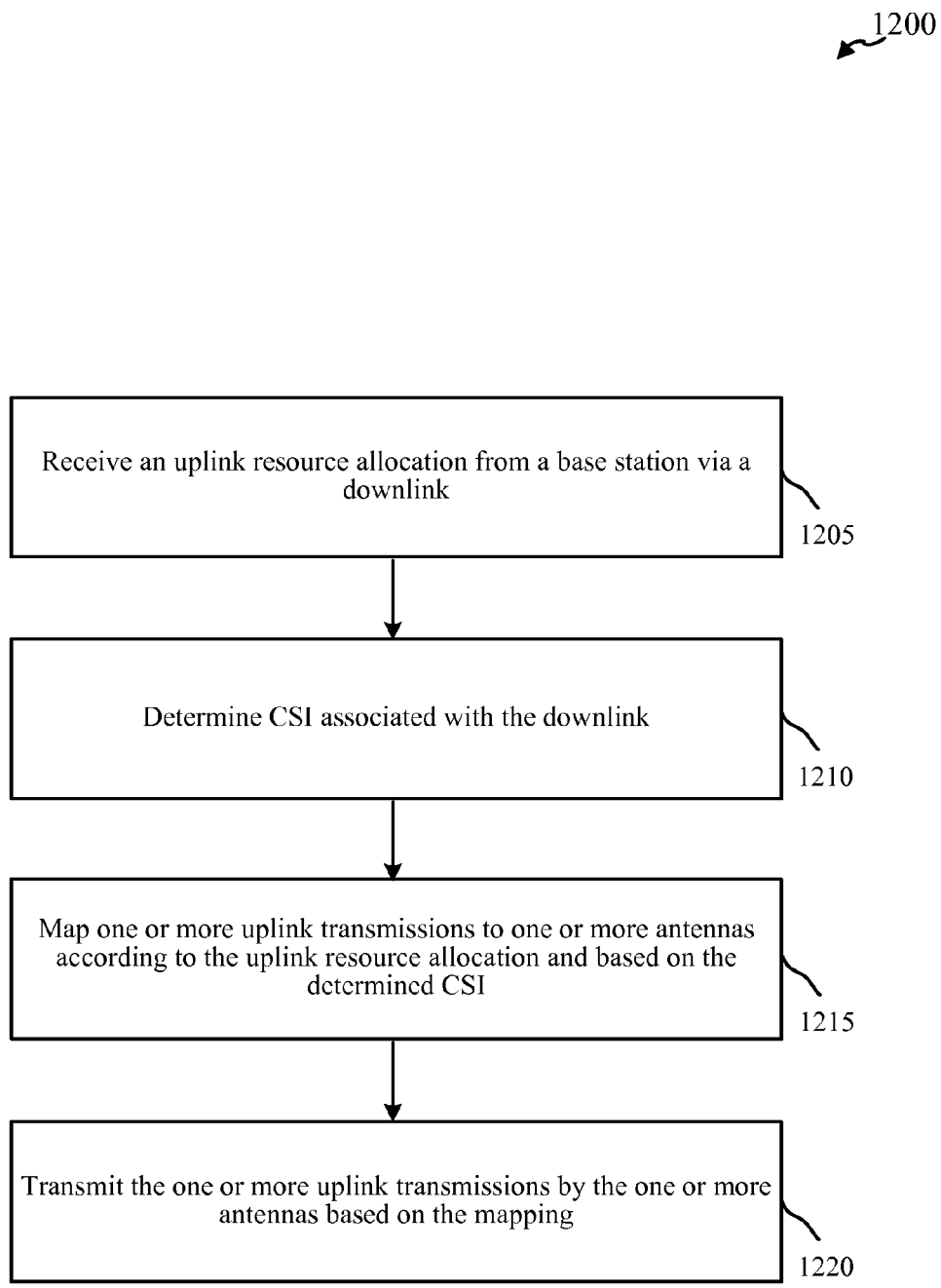

FIG. 12 is a flow chart illustrating an example of a method 1200 for wireless communication, in accordance with various aspects of the present disclosure. For clarity, the method 1200 is described below with reference to aspects of one or more of a UE 115 described with reference to previous FIG. 1-4B or 7-9, or aspects of one or more devices 505 described with reference to FIG. 5 or 6. In some examples, a UE 115 may execute one or more sets of codes to control the functional elements of the UE 115 to perform the functions described below. Additionally or alternatively, the UE 115 may perform one or more of the functions described below using special-purpose hardware.

At block 1205, the method 1200 may include a UE 115 receiving an uplink resource allocation from a base station, such as base station 105, via a downlink, such as downlink 210. The operation(s) at block 1205 may be performed using the receiver module 510 or transceiver module 720 and one or more antennas 205, or one or more RF blocks 820 described with reference to FIG. 5, 6, 7, 8A, or 8B.

At block 1210, the UE 115 determine CSI associated with the downlink. The CSI may include at least one of SNR, SINR, or RSSI, or other like metrics. In some cases, the CSI may be associated with each antenna 205 of the UE 115, or multiple antennas 205 of the UE, for example by an average value of multiple antennas 205. The operation(s) at block 1210 may be performed using the DL/UL RB correspondence module 610, or one or both of the channel estimator 830 and the CSI module 615 described with reference to FIG. 5, 6, 7, 8A, or 8B.

At block 1215, the UE 115 may map one or more uplink transmissions to one or more antennas, such as antennas 205, according to the uplink resource allocation and based on the determined CSI. The operation(s) at block 1215 may be performed using the UL antenna mapping module 515, the UL antenna selection module 620, one or more of the CSI module 615 and the antenna switching module 725, or the digital base band 810, described with reference to FIG. 5, 6, 7, 8A, or 8B.

In some implementations, the UE 115 may map one or more uplink transmissions to one or more antennas on an individual RB basis.

At block 1220, the UE 115 may transmit the one or more uplink transmissions by the one or more antennas, such as antennas 205, based on the mapping. The operation(s) at block 1215 may be performed using the transmitter module 520, transceiver module 720 and one or more antennas 205, or one or more RF blocks 820 described with reference to FIG. 5, 6, 7, 8A, or 8B.

Thus, the method 1200 may provide for wireless communication. It should be noted that the method 1200 is just one implementation and that the operations of the method 1200 may be rearranged or otherwise modified such that other implementations are possible.

In some examples, aspects from two or more of the methods 1000, 1100, or 1200 may be combined. It should be noted that the methods 1000, 1100, and 1200 are just example implementations, and that the operations of the methods 1000-1200 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication at a user equipment (UE), comprising:
   receiving, from a base station, an uplink resource allocation comprising a set of resource blocks for the UE;
   determining respective downlink channel characteristics for each antenna of a plurality of antennas of the UE, the downlink channel characteristics corresponding to the set of resource blocks;
   mapping, based at least in part on the determined respective downlink channel characteristics, a first subset of the set of resource blocks to a first antenna of the plurality of antennas and a second subset of the set of resource blocks to a second antenna of the plurality of antennas, the first subset different from the second subset; and
   using at least one of the first subset and the second subset of the set of resource blocks to transmit one or more uplink transmissions on a respective antenna of the plurality of antennas based at least in part on the mapping.

2. The method of claim 1, wherein the mapping the first subset and the second subset the set of resource blocks to the respective antennas is performed on at least one of a per slot basis or a per sub frame basis.

3. The method of claim 1, wherein the determining the respective downlink channel characteristics for each antenna of the plurality of antennas further comprises:
   determining the respective downlink channel characteristics for each antenna that include at least one of a signal-to-noise ratio (SNR), a signal-to-interference plus noise ratio (SINR), or a received signal strength indicator (RSSI).

4. The method of claim 1, further comprising:
   determining downlink channel state information (CSI) for each antenna of the plurality of antennas.

5. The method of claim 4, wherein the mapping the first subset and the second subset of the set of resource blocks to the respective antennas of the plurality of antennas comprises:
   mapping individual resource blocks to the respective antennas of the plurality of antennas based at least in part on the determined downlink CSI for each antenna of the plurality of antennas.

6. The method of claim 4, wherein sub-carriers used for the CSI determination correspond to the first subset and the second subset of the set of resource blocks.

7. The method of claim 4, further comprising:
   measuring current downlink CSI for at least one antenna of the plurality of antennas; and
   accessing historical CSI for the at least one antenna of the plurality of antennas;
   wherein the determining the downlink CSI for each antenna comprises determining the downlink CSI for the at least one antenna of the plurality of antennas based at least in part on the measuring, the accessing, or a combination thereof.

8. The method of claim 1, wherein the first antenna or the second antenna has a highest downlink channel state information (CSI) of the plurality of antennas.

9. The method of claim 1, wherein the using at least one of the first subset and the second subset of the set of resource blocks to transmit one or more uplink transmissions on the respective antenna comprises:
   selecting the first antenna and the second antenna at a digital baseband of the UE.

10. The method of claim 1, wherein the using at least one of the first subset and the second subset of the set of resource blocks to transmit one or more uplink transmissions on the respective antenna comprises:
    selecting the first antenna and the second antenna at an antenna port of the UE.

11. The method of claim 1, wherein the first subset of the set of resource blocks and the second subset of the set of resource blocks comprise disjoint subsets.

12. An apparatus for wireless communication, comprising:
    means for receiving, from a base station, an uplink resource allocation comprising a set of resource blocks for the apparatus;
    means for determining respective downlink channel characteristics for each antenna of a plurality of antennas of the apparatus, the downlink channel characteristics corresponding to the set of resource blocks;
    means for mapping, based at least in part on the determined respective downlink channel characteristics, a first subset of the set of resource blocks to a first antenna of the plurality of antennas and a second subset of the set of resource blocks to a second antenna of the plurality of antennas, the first subset different from the second subset; and
    means for using at least one of the first subset and the second subset of the set of resource blocks to transmit one or more uplink transmissions on a respective antenna of the plurality of antennas based at least in part on the mapping.

13. The apparatus of claim 12, wherein the mapping the first subset and the second subset of the set of resource blocks to the respective antennas is performed on at least one of a per slot basis or a per sub frame basis.

14. The apparatus of claim 12, further comprising:
means for determining downlink channel state information (CSI) for each antenna of the plurality of antennas.

15. The apparatus of claim 14, wherein the means for mapping the first subset and the second subset of the set of resource blocks to the respective antennas of the plurality of antennas further comprises:
means for mapping individual resource blocks to the respective antennas of the plurality of antennas based at least in part on the downlink CSI for the plurality of antennas.

16. The apparatus of claim 14, wherein sub-carriers used for the CSI determination correspond to the first subset and the second subset of the set of resource blocks.

17. The apparatus of claim 14, wherein the means for determining the downlink CSI further comprises:
means for measuring current downlink CSI for each antenna of the plurality of antennas, means for accessing historical CSI for each antenna of the plurality of antennas, or a combination thereof.

18. The apparatus of claim 12, wherein the means for determining the respective downlink channel characteristics for each antenna of the plurality of antennas further comprises:
means for determining at least one of a signal-to-noise ratio (SNR), a signal-to-interference plus noise ratio (SINR), or a received signal strength indicator (RSSI).

19. An apparatus for wireless communication, comprising:
a processor;
memory in electronic communication with the processor; and
instructions stored in the memory, the instructions being executable by the processor to:
receive, from a base station, an uplink resource allocation comprising a set of resource blocks;
determine respective downlink channel characteristics for each antenna of a plurality of antennas of the apparatus, the downlink channel characteristics corresponding to the set of resource blocks;
map, based at least in part on the determined respective downlink channel characteristics, a first subset of the set of resource blocks to a first antenna of the plurality of antennas and a second subset of the set of resource blocks to a second antenna of the plurality of antennas, the first subset different from the second subset; and
use at least one of the first subset and the second subset of the set of resource blocks to transmit one or more uplink transmissions on a respective antenna of the plurality of antennas based at least in part on the mapping.

20. The apparatus of claim 19, wherein the instructions to map the first subset and the second subset of the set of resource blocks to the respective antennas include instructions to map the first subset and the second subset of the set of resource blocks on at least one of a per slot basis or a per sub frame basis.

21. The apparatus of claim 19, wherein the instructions stored in the memory are further executable by the processor to:
determine downlink channel state information (CSI) for each antenna of the plurality of antennas.

22. The apparatus of claim 21, wherein the instructions to map the first subset and the second subset of the set of resource blocks include instructions to:
map individual resource blocks to the respective antennas of the plurality of antennas based at least in part on the determined downlink CSI for each antenna of the plurality of antennas.

23. The apparatus of claim 21, wherein sub-carriers used for the CSI determination correspond to the first subset and the second subset of the set of resource blocks.

24. The apparatus of claim 21 wherein the instructions to determine the downlink CSI further include instructions to:
measure current downlink CSI for at least one antenna of the plurality of antennas, access historical CSI of the at least one antenna of the plurality of antennas, or a combination thereof.

25. The apparatus of claim 19, wherein the instructions to determine the respective downlink channel characteristics for each antenna of the plurality of antennas include instructions to:
determine at least one of a signal-to-noise ratio (SNR), a signal-to-interference plus noise ratio (SINR), or a received signal strength indicator (RSSI).

26. The apparatus of claim 19, wherein the first subset of the set of resource blocks and the second subset of the set of resource blocks comprise disjoint subsets.

* * * * *